(12) United States Patent
Kojima

(10) Patent No.: US 7,258,110 B2
(45) Date of Patent: Aug. 21, 2007

(54) FUEL SUPPLY APPARATUS AND INTERNAL COMBUSTION ENGINE

(75) Inventor: Susumu Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 11/127,267

(22) Filed: May 12, 2005

(65) Prior Publication Data
US 2005/0257775 A1 Nov. 24, 2005

(30) Foreign Application Priority Data
May 24, 2004 (JP) .............................. 2004-153310

(51) Int. Cl.
*F02M 37/04* (2006.01)
*F02M 37/08* (2006.01)

(52) U.S. Cl. ...................... 123/514; 123/456

(58) Field of Classification Search .............. 123/514, 123/456, 447, 446, 458, 338
See application file for complete search history.

(56) References Cited

U.S. PATENT DOCUMENTS

| | | | | |
|---|---|---|---|---|
| 5,878,718 A | * | 3/1999 | Rembold et al. ............ | 123/456 |
| 5,918,578 A | * | 7/1999 | Oda ............................ | 123/456 |
| 6,058,912 A | * | 5/2000 | Rembold et al. ............ | 123/516 |
| 6,142,127 A | * | 11/2000 | Maass ......................... | 123/514 |
| 6,382,184 B2 | | 5/2002 | Nakamura et al. | |
| 6,772,738 B2 | * | 8/2004 | Rembold et al. ............ | 123/514 |
| 6,959,697 B2 | * | 11/2005 | Kojima ........................ | 123/516 |
| 2005/0092302 A1 | * | 5/2005 | Kojima ........................ | 123/458 |

FOREIGN PATENT DOCUMENTS

| | | |
|---|---|---|
| DE | 100 59 571 A1 | 6/2001 |
| JP | A 08-334076 | 12/1996 |
| JP | A 2002-317669 | 10/2002 |
| JP | A 2003-120460 | 4/2003 |

OTHER PUBLICATIONS

Bosch, Robert (editor). Dieselmotor-Management, 1998. pp. 270-271.

* cited by examiner

*Primary Examiner*—Mahmoud Gimie
(74) *Attorney, Agent, or Firm*—Oliff & Berridge, PLC

(57) ABSTRACT

A fuel supply apparatus suppresses bubble generation of fuel in a delivery pipe and fuel leakage while suppressing power consumption. The fuel supply apparatus includes a fuel supply controller which is provided with a state determining unit that determines at least one of bubble generation of fuel in the delivery pipe and fuel leakage from a fuel injection valve to which fuel is supplied via the delivery pipe, and a fuel pressure controlling unit that activates a fuel feeding unit when the bubble generation is expected and activates a fuel pressure decreasing unit when the fuel leakage is expected. The fuel supply controller intermittently activates during the suspension of the operation of internal combustion engine using a timer, to adjust fuel pressure in the delivery pipe.

19 Claims, 13 Drawing Sheets

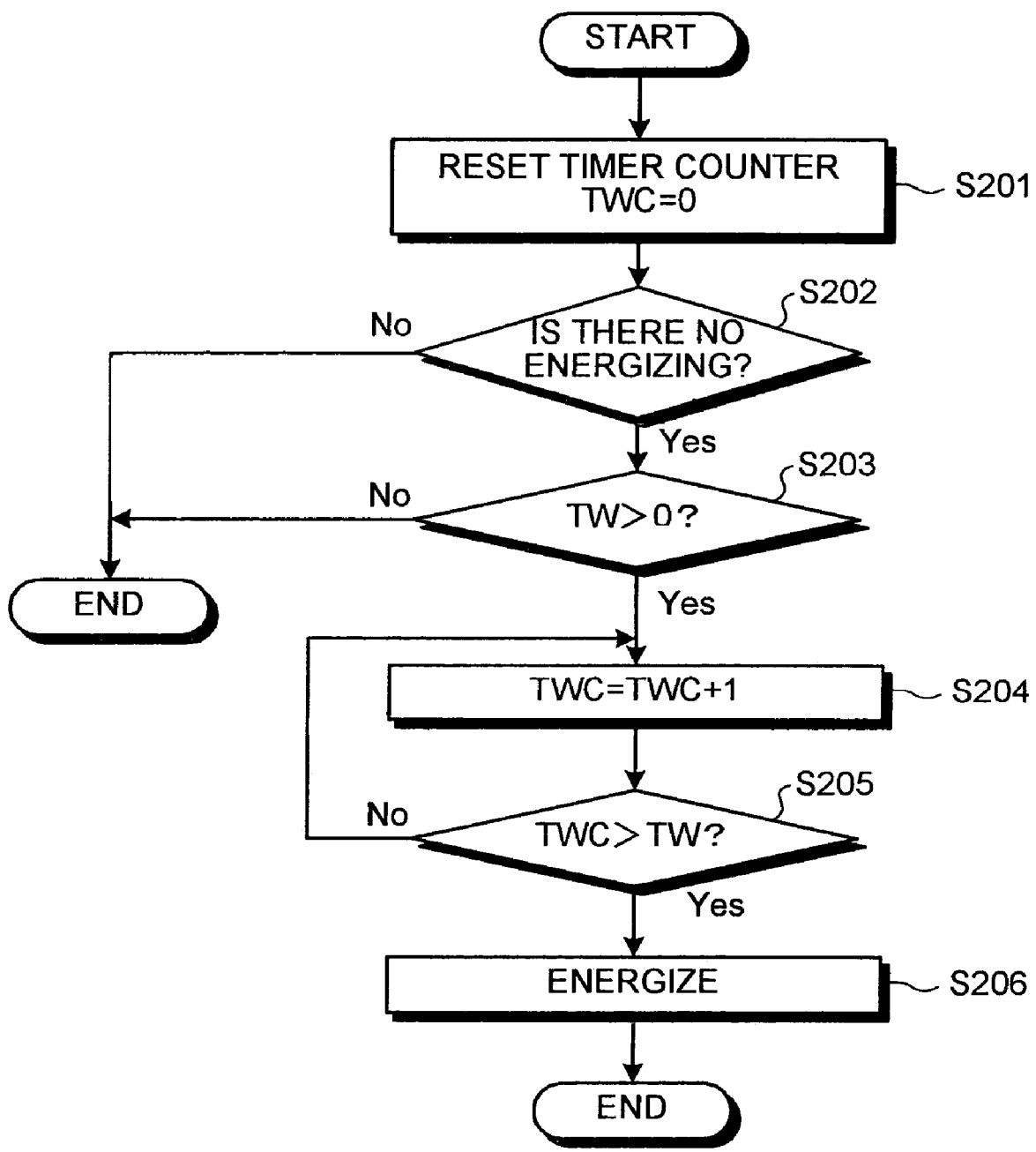

FUEL SUPPLY APPARATUS AND INTERNAL COMBUSTION ENGINE

BACKGROUND OF THE INVENTION

1. Field of the Invention

The present invention relates to an internal combustion engine that directly injects fuel into a combustion chamber via a fuel injection valve, and more particularly to techniques for fuel supply to suppress bubble generation in the fuel in a delivery pipe.

2. Description of the Related Art

Known direct injection internal combustion engine directly, which injects fuel into a combustion chamber to cause combustion, is provided with a fuel injection valve to allow injection of fuel into the combustion chamber. The fuel injection valve is attached to a fuel distributing pipe called a delivery pipe to supply highly pressurized fuel. Since the delivery pipe is attached to the internal combustion engine, the fuel inside the delivery pipe is heated by the internal combustion engine in the operation, whereas the fuel is cooled down after the end of the operation. With the cooling down, the fuel inside the delivery pipe contracts, to lower the pressure of the fuel inside the delivery pipe. As a result, the fuel pressure in the delivery pipe drops below a saturated vapor pressure at the temperature drop, to generate bubbles of fuel vapor or of air dissolved in the fuel in the delivery pipe.

At the start-up of the internal combustion engine, the fuel pressure inside the delivery pipe is required to be risen to a certain degree. However, when the bubbles are generated in the fuel in the delivery pipe, the fuel pressure does not rise in the delivery pipe until the bubbles are broken. When the bubbles are formed in the fuel in the delivery pipe, the injection of the fuel from the fuel injection valve cannot start immediately after the start-up. To suppress the bubble generation in the fuel in the delivery pipe, a technique is suggested in Japanese Patent Application Laid-Open No. 2003-120460 to maintain the fuel pressure in the delivery pipe at a level equal to or higher than a set pressure during the suspension of the engine operation thereby suppressing the bubble generation in the fuel in the delivery pipe.

When the internal combustion engine is employed as a power source for a vehicle, a battery is usually mounted on the vehicle to start up the internal combustion engine. The technique disclosed in Japanese Patent Application Laid-Open No. 2003-120460 drives a fuel pressurizing unit for the pressurization of fuel in the delivery pipe in the internal combustion engine under suspension, thereby increasing the power consumption. Though the Japanese Patent Application Laid-Open No. 2003-120460 does not disclose the inconvenience of increased power consumption during the engine suspension, there remains a room of improvement.

In addition, when the fuel pressure in the delivery pipe is excessively high, the fuel may leak out from a fuel injection port of the fuel injection valve (hereinafter referred to as "fuel leakage"). The fuel leakage makes the fuel atomization poor at the start-up of the internal combustion engine, resulting in degraded emission. To eliminate such inconveniences, the fuel pressure in the delivery pipe during the engine suspension is preferably in a range that allows the suppression of bubble generation and maintains the fuel leakage to an acceptable degree. The technique disclosed in Japanese Patent Application Laid-Open No. 2003-120460, though allows the suppression of bubble generation in the fuel in the delivery pipe, cannot eliminate the occurrence of unacceptable fuel leakage depending on the condition of pressurization.

SUMMARY OF THE INVENTION

In view of the foregoing, an object of the present invention is to provide a fuel supply apparatus and an internal combustion engine which achieve at least one of the suppression of bubble generation in the fuel in the delivery pipe together with the low power consumption, and the suppression of fuel leakage from the fuel injection valve together with the low power consumption.

To solve the problems as described above and to achieve an object, a fuel supply apparatus according to one aspect of the present invention includes a delivery pipe that accumulates fuel to be supplied to an internal combustion engine; a fuel feeding unit that supplies fuel to the delivery pipe; a fuel supply controller that includes a state determining unit which determines bubble generation in fuel in the delivery pipe, and a fuel pressure controlling unit which activates the fuel feeding unit when the bubble generation is expected; and an activating unit that intermittently activates the fuel supply controller while operation of the internal combustion engine is under suspension, and operates even while operation of the fuel supply controller is under suspension.

The fuel supply apparatus intermittently activates the fuel supply controller during the suspension of the operation of the internal combustion engine, and drives the fuel feeding unit to remove the bubbles in the delivery pipe. With such intermittent activation of the fuel supply controller, the suppression of power consumption as well as the bubble generation in the fuel in the delivery pipe can be realized.

A fuel supply apparatus according to another aspect of the present invention includes a delivery pipe that accumulates fuel to be supplied to an internal combustion engine; a fuel pressure decreasing unit that decreases a fuel pressure in the delivery pipe; a fuel supply controller that includes a state determining unit that determines fuel leakage from a fuel injection valve to which fuel is supplied from the delivery pipe, and a fuel pressure controlling unit which activates the fuel pressure decreasing unit when the fuel leakage is expected; and an activating unit that intermittently activates the fuel supply controller while operation of the internal combustion engine is under suspension, and operates even while operation of the fuel supply controller is under suspension.

This fuel supply apparatus intermittently activates the fuel supply controller during the suspension of the operation of the internal combustion engine, and drives the fuel pressure decreasing unit. Thus, the fuel pressure in the delivery pipe is lowered and the fuel leakage from the fuel injection valve is suppressed. With the intermittent activation of the fuel supply controller, the suppression of power consumption as well as the fuel leakage from the fuel injection valve can be achieved.

A fuel supply apparatus according to still another aspect of the present invention includes a delivery pipe that accumulates fuel to be supplied to an internal combustion engine; a fuel pressure decreasing unit that decreases a fuel pressure in the delivery pipe; a fuel feeding unit that supplies fuel to the delivery pipe; a fuel supply controller that includes a state determining unit which determines at least one of bubble generation in fuel in the delivery pipe and fuel leakage from a fuel injection valve to which fuel is supplied from the delivery pipe, and a fuel pressure controlling unit which activates the fuel feeding unit when the bubble generation is expected and activates the fuel pressure decreasing unit when the fuel leakage is expected; and an activating unit which intermittently activates the fuel supply controller while operation of the internal combustion engine is under suspension, and operates even while the fuel supply controller suspends its operation.

This fuel supply apparatus intermittently activates the fuel supply controller during the suspension of the operation of the internal combustion engine, drives the fuel feeding unit or the fuel pressure decreasing unit to adjust the fuel pressure in the delivery pipe. Thus, the bubbles generated in the fuel in the delivery pipe can be removed. In addition, the fuel leakage from the fuel injection valve can be suppressed. Thus, since the fuel supply apparatus intermittently activates the fuel supply controller to drive the fuel feeding unit, the bubbles in the fuel can be removed while the power consumption is suppressed. In addition, since the fuel supply apparatus intermittently activates the fuel supply controller to drive the fuel pressure decreasing unit, the suppression of fuel leakage from the fuel injection valve as well as power consumption can be achieved.

Further, in the fuel supply apparatus, the fuel supply controller further includes an activation controller that determines an activation time so as to activate the state determining unit and the fuel pressure controlling unit at predetermined intervals, and the fuel supply controller intermittently activates the state determining unit and the fuel pressure controlling unit by counting up the determined activation time by the activation controlling unit.

Further, in the fuel supply apparatus, the fuel pressure controlling unit activates the fuel feeding unit when fuel pressure in the delivery pipe is equal to or lower than a saturated vapor pressure of fuel in the delivery pipe, and the fuel pressure in the delivery pipe and cooling water temperature of the internal combustion engine are on the decline.

Further, in the fuel supply apparatus, the fuel pressure controlling unit determines a target fuel pressure of the delivery pipe based on temperature change of the fuel in the delivery pipe, and the fuel pressure controlling unit activates one of the fuel feeding unit and the fuel pressure decreasing unit so that the fuel pressure in the delivery pipe attain a level of the determined target fuel pressure.

Further, in the fuel supply apparatus, the activation controller determines an interval to intermittently activate the state determining unit and the fuel pressure controlling unit based on a trend of changes in the fuel pressure in the delivery pipe and the cooling water temperature of the internal combustion engine.

Further, in the fuel supply apparatus, the interval to intermittently activate the state determining unit and the fuel pressure controlling unit is corrected based on an external air temperature.

Further, in the fuel supply apparatus, the fuel pressure controlling unit activates the fuel pressure decreasing unit when the fuel pressure is equal to or higher than a minimum operation pressure of the fuel pressure decreasing unit and equal to or higher than the saturated vapor pressure of the fuel in the delivery pipe, and the fuel pressure is at a level expected to cause fuel leakage equal to or more than a predetermined amount.

Further, in the fuel supply apparatus, the operation time of the fuel pressure decreasing unit is set from start of the operation of the fuel pressure decreasing unit up to a point where the fuel leakage is expected to be less than the predetermined amount.

Further, in the fuel supply apparatus, the fuel pressure controlling unit activates the fuel feeding unit when the fuel pressure is equal to or lower than a saturated vapor pressure determined by the temperature of the fuel, the temperature of the fuel in the delivery pipe is on the decline, and an amount of bubbles in the fuel expected from temperature changes of the fuel, a volume of the delivery pipe, and expansion coefficient of the fuel, is equal to or more than a predetermined amount.

Further, in the fuel supply apparatus, the operation time of the fuel feeding unit is from a start of the operation of the fuel feeding unit up to a point where the amount of bubbles becomes less than the predetermined amount.

Further, in the fuel supply apparatus, the fuel pressure controlling unit changes an operation condition of the fuel feeding unit when a time required for rise of the fuel pressure in the delivery pipe at start-up of the internal combustion engine is longer than a predetermined reference pressure rise time.

Further, in the fuel supply apparatus, the activating unit stops reactivation of the state determining unit and the fuel pressure controlling unit when the change in the fuel pressure in the delivery pipe is in a predetermined range after the activation of one of the fuel pressure decreasing unit and the fuel feeding unit.

Further, in the fuel supply apparatus, the activation of the state determining unit and the fuel pressure controlling unit are stopped either when a battery for operation of the internal combustion engine is removed or when voltage of the battery drops to a level equal to or lower than a predetermined value.

Further, in the fuel supply apparatus, the activation of the state determining unit and the fuel pressure controlling unit is stopped when a sum of the operation time of the fuel pressure decreasing unit and operation time of the fuel feeding unit exceeds a predetermine time.

An internal combustion engine according to still another aspect of the present invention includes a fuel supply apparatus. The fuel supply apparatus includes a fuel feeding unit that supplies fuel to the delivery pipe; a fuel supply controller which includes a state determining unit that determines bubble generation in fuel in the delivery pipe, and a fuel pressure controlling unit that activates the fuel feeding unit when the bubble generation is expected; and an activation controlling unit which intermittently activates the fuel supply controller even when operation of the internal combustion engine is under suspension, and operates even when the fuel supply controller suspends its operation.

This internal combustion engine intermittently activates the fuel supply controller to drive the fuel feeding unit, to allow the removal of bubbles in the fuel while suppressing the power consumption. In addition, since the internal combustion engine intermittently activates the fuel supply controller to drive the fuel pressure decreasing unit, to allow the suppression of fuel leakage from the fuel injection valve while suppressing the power consumption.

An internal combustion engine according to still another aspect of the present invention includes a fuel supply apparatus. The fuel supply apparatus includes a fuel pressure decreasing unit that is capable of decreasing a fuel pressure in the delivery pipe; a fuel supply controller which includes a state determining unit that determines fuel leakage from a fuel injection valve to which fuel is supplied from the delivery pipe, and a fuel pressure controlling unit that activates the fuel pressure decreasing unit when the fuel leakage is expected; and an activation controlling unit which intermittently activates the fuel supply controller while operation of the internal combustion engine is under suspension, and operates even while the fuel supply controller suspends its operation.

This internal combustion engine intermittently activates the fuel supply controller during the suspension of the operation to drive the fuel pressure decreasing unit. Thus, the fuel pressure in the delivery pipe is lowered and the fuel leakage from the fuel injection valve is suppressed. Since the internal combustion engine intermittently activates the fuel supply controller, the suppression of fuel leakage from the fuel injection valve as well as power consumption can be achieved.

An internal combustion engine according to still another aspect of the present invention includes a fuel supply apparatus. The fuel supply apparatus includes a fuel pressure decreasing unit that decreases a fuel pressure in the delivery pipe; a fuel feeding unit that supplies fuel to the delivery pipe; a fuel supply controller which includes a state determining unit that determines at least one of bubble generation in fuel in the delivery pipe and fuel leakage from a fuel injection valve to which fuel is supplied from the delivery pipe, and a fuel pressure controlling unit that activates the fuel feeding unit when the bubble generation is expected and activates the fuel pressure decreasing unit when the fuel leakage is expected; and an activating unit which intermittently activates the fuel supply controller while operation of the internal combustion engine is under suspension, and operates even while the fuel supply controller suspends its operation.

This internal combustion engine intermittently drives the fuel supply controller during the suspension of the operation to drive the fuel feeding unit or the fuel pressure decreasing unit, thereby adjusting the fuel pressure in the delivery pipe. Thus, the removal of bubbles generated in the fuel in the delivery pipe can be achieved. Further, since the internal combustion engine intermittently activates the fuel supply controller to drive the fuel feeding unit, the removal of the bubbles in the fuel can be achieved together with the suppression in power consumption. Still further, since the internal combustion engine intermittently activate the fuel supply controller to drive the fuel pressure decreasing unit, the suppression of the fuel leakage from the furl injection valve as well as the suppression of power consumption can be achieved.

According to the fuel supply apparatus and the internal combustion engine of the present invention, the suppression of bubble generation in the fuel in the delivery pipe is allowed together with the suppression of power consumption. In addition, the fuel supply apparatus and the internal combustion engine according to the present invention allow the suppression of the fuel leakage from the fuel injection valve together with the suppression of power consumption.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart of activation control with a timer;

DETAILED DESCRIPTION OF THE PREFERRED EMBODIMENTS

Exemplary embodiments of the present invention will be described in detail with reference to accompanying drawings. It should be noted that the present invention is not limited to the embodiments as described below. Components of the embodiment described below may include or equivalent to components readily conceived by those skilled in the art. The present invention is applicable to any internal combustion engine which directly injects the fuel into a combustion chamber, such as direct-injection spark-ignition internal combustion engines, or diesel engines. The present invention is similarly advantageously applicable to internal combustion engines to be mounted on vehicles such as automobiles, buses, or trucks.

A first embodiment is characterized in that a fuel pressure controller is provided, which controls a fuel feeding unit and a fuel pressure decreasing unit so that the fuel feeding unit is activated to pressurize and transport the fuel into a delivery pipe when the fuel in the delivery pipe is determined to generate bubbles therein, whereas the fuel pressure decreasing unit attached to the delivery pipe is activated when it is determined that the fuel leakage occurs from a fuel injection valve, and that the fuel pressure controller conducts intermittent activations during the suspension of the operation of the internal combustion engine.

Figure 1:
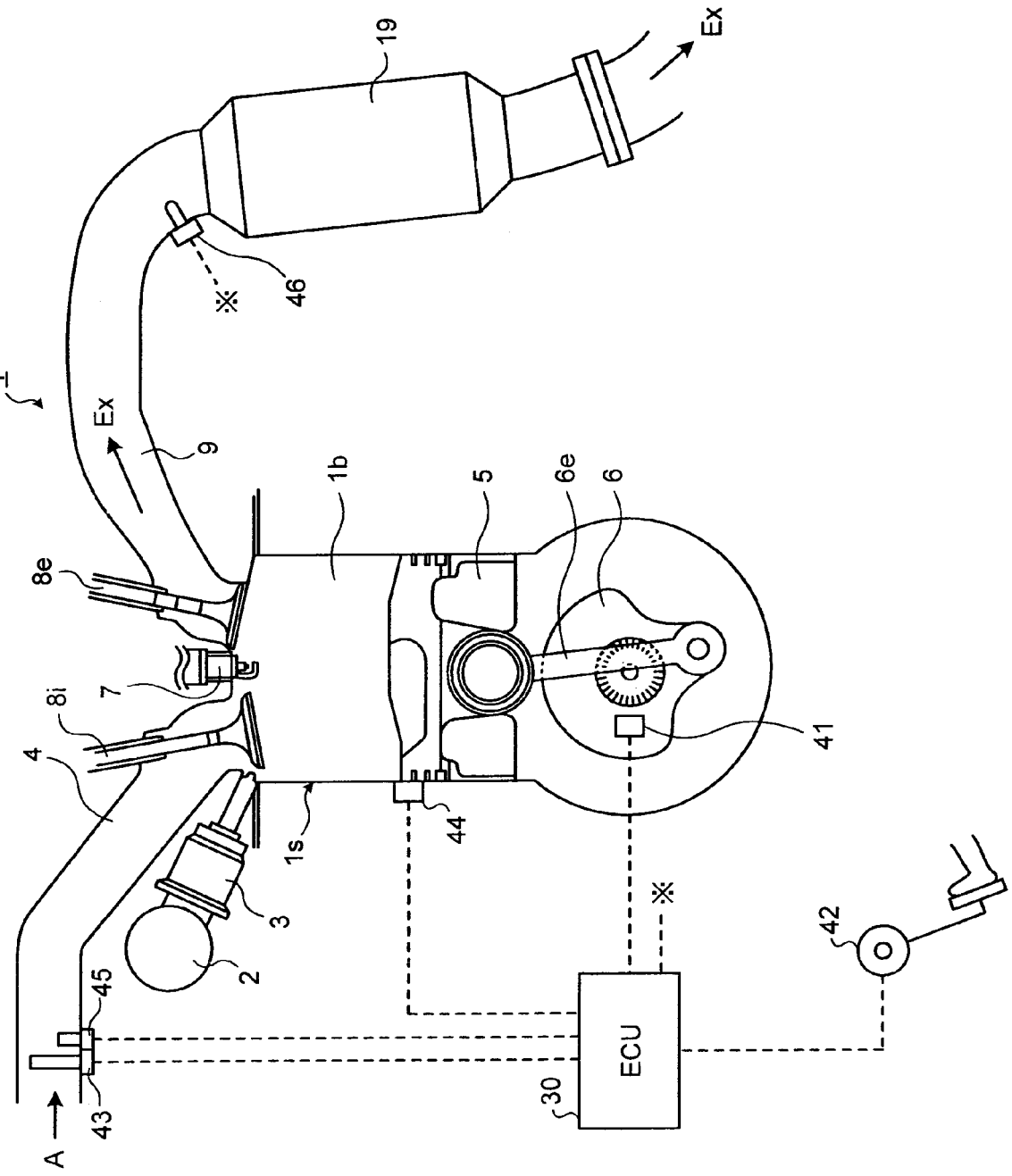
FIG. 1 is a section of a cylinder in an internal combustion engine to which a fuel supply controller according to a first embodiment is applicable.

Prior to the description of a fuel supply controller according to a first embodiment, a brief description will be given concerning an internal combustion engine and a fuel supply apparatus to which the fuel supply controller of the first embodiment is applicable. FIG. 1 is a section of a cylinder provided in an internal combustion engine to which the fuel supply controller of the first embodiment is applicable. An internal combustion engine 1, which is a spark-ignition reciprocal internal combustion engine, directly injects the fuel into a combustion chamber $1b$ in a cylinder is via a fuel injection valve 3 to generate air-fuel mixture. The internal combustion engine 1 may be provided with a port injection valve to inject the fuel into an intake port 4.

Inside the cylinder $1s$ of the internal combustion engine 1, a piston 5 is arranged to reciprocate according to the combustion of the air-fuel mixture. The fuel injection valve 3 passes the fuel supplied from a delivery pipe 2 which serves as a fuel distributing unit and directly injects the fuel into the combustion chamber $1b$. The fuel is directly injected into the combustion chamber $1b$ via the fuel injection valve 3 to be combined with air A introduced into the combustion chamber $1b$ via the intake port 4 which serves as an intake path to generate air-fuel mixture.

The fuel is injected into the combustion chamber $1b$ via the fuel injection valve 3 at a timing and by a necessary amount corresponding to a load KL and a number of rotations NE of the internal combustion engine 1. The fuel injected via the fuel injection valve 3 into the combustion chamber $1b$ is combined with air A which is guided to the intake port 4, passes through an intake valve $8i$ to be introduced into the combustion chamber $1b$, thereby generating air-fuel mixture. An ignition plug 7 ignites the air-fuel mixture to cause combustion. The firing pressure of the air-fuel mixture is transmitted to a piston 5 to cause reciprocation thereof.

The reciprocation of the piston 5 is transmitted to a crank shaft 6 via a connecting rod $6e$ to be converted into a rotation movement which is utilized as an output of the internal combustion engine 1. The air-fuel mixture after the combustion turns into an exhaust gas Ex, which is discharged via an exhaust valve $8e$ to an exhaust port 9 which serves as an exhaust path. The exhaust gas Ex is purified by a catalyst 19 provided downstream of the exhaust port 9 to be discharged into the atmosphere.

An engine ECU 30 (Electronic Control Unit) controls the operation of the internal combustion engine 1. The engine ECU 30 receives outputs from a crank angle sensor 41, an axel opening sensor 42, an air flow sensor 43, a cooling water temperature sensor 44, an intake temperature sensor 45, an $O_2$ sensor 46, and other sensors to control the operation of the internal combustion engine 1. As described later, the fuel supply controller of the embodiment is incorporated in the engine ECU 30.

Figure 2:
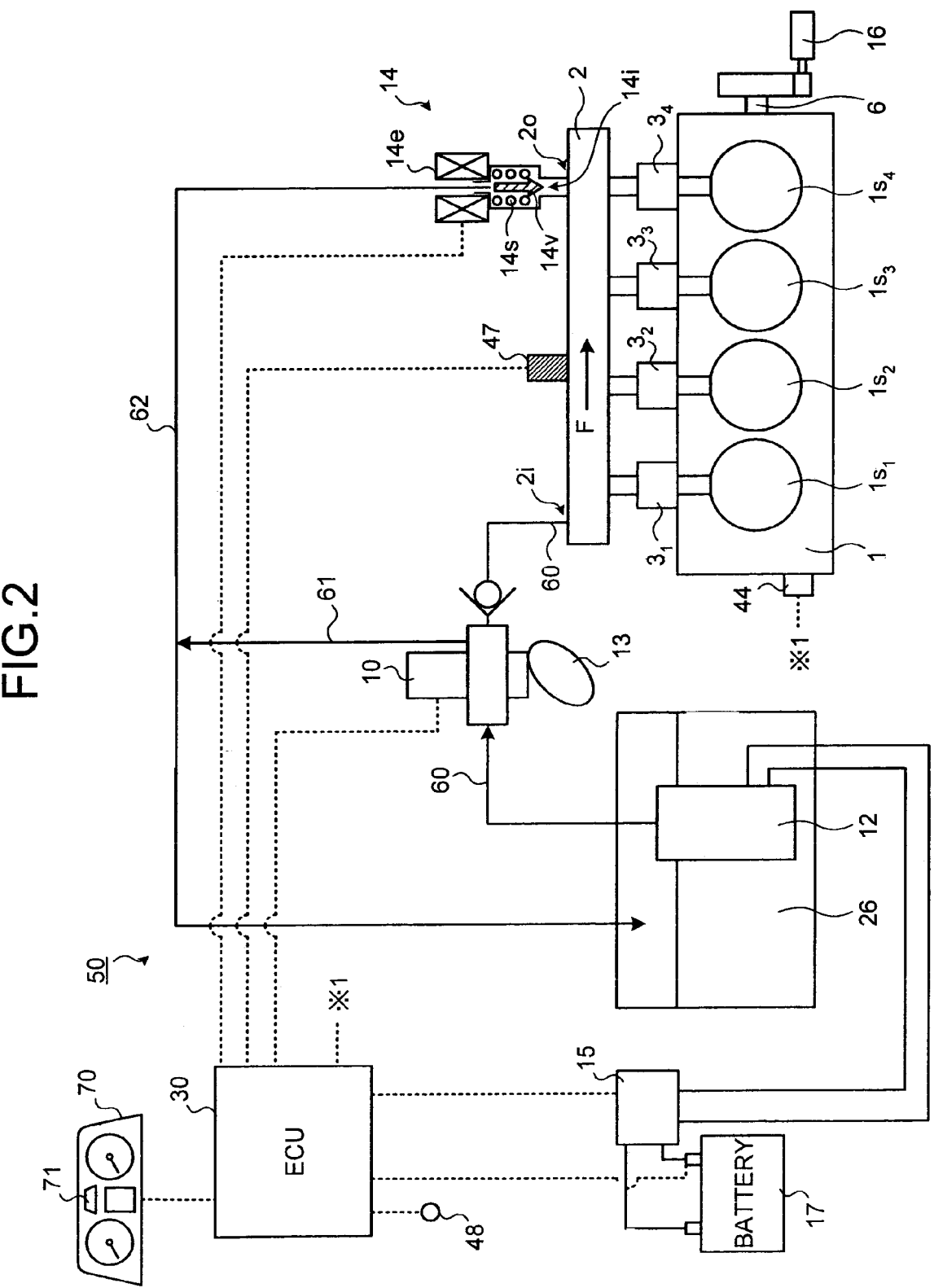
FIG. 2 is a conceptual diagram of an example of a fuel supply apparatus according to the first embodiment.

FIG. 2 is a conceptual diagram of an example of the fuel supply apparatus of the first embodiment. The internal combustion engine 1 to which a fuel supply apparatus 50 supplies the fuel is a four-cylinder internal combustion engine. The present invention, however, is applicable to a six-cylinder, an eight-cylinder, or a single cylinder internal combustion engine. The fuel in a fuel tank 26 is fed to a high pressure pump 10, which serves as a fuel feeding unit, via a fuel supply pipe 60 by a feed pump 12, which also serves as a fuel feeding unit.

The fuel supply apparatus 50 according to the first embodiment includes at least the delivery pipe, the fuel supply controller in the engine ECU 30, and an activator that intermittently activates the fuel supply controller. The fuel supply apparatus 50 includes the feed pump or the high pressure pump 10 which serves as the fuel feeding unit, and an electromagnetic relief valve 14 which serves as a fuel pressure decreasing unit as necessary. The operation of the feed pump 12 is controlled by the engine ECU 30 via a feed pump driver 15. The feed pump driver 15 is connected to a battery 17. The feed pump driver 15 supplies power to the feed pump 12 according to control signals supplied from the engine ECU 30 to drive the same. The engine ECU 30 monitors voltage, state of charge (SOC), or the like of the battery 17.

A cam shaft 13 of the internal combustion engine 1 drives the high pressure pump 10 to increase the fuel pressure up to a necessary level for the fuel injection valves $3_1$-$3_4$. The fuel is fed from the high pressure pump 10 to the delivery pipe 2 and distributed to the fuel injection valve $3_1$-$3_4$ which inject the fuel into cylinders $1s_1$-$1s_4$, respectively. The high pressure pump 10 can also serve as the fuel feeding unit to remove the bubbles generated in the fuel in the delivery pipe 2. For example, the high pressure pump 10 can pressurize and transport the fuel into the delivery pipe 2 by driving a starter motor 16 thereby removing the bubbles generated in the fuel in the delivery pipe 2 at the time of pressurization of the fuel in the delivery pipe. Here, the internal combustion engine 1 may be started up and utilized for the driving of the high pressure pump 10.

The electromagnetic relief valve 14 is attached to an outlet $2_0$ of the delivery pipe 2. The electromagnetic relief valve 14 is normally closed (NC), i.e., when a solenoid $14e$ is not energized, the relief valve 14 closes a relief valve inlet $14i$ by a valve plug $14v$. Thus, when the solenoid $14e$ is not energized, the electromagnetic relief valve 14 opens if the fuel pressure in the delivery pipe 2 rises above a set level, so as to prevent fuel pressure in the delivery pipe 2 from rising above a set level. Then, the excessive portion of the fuel is fed back to the fuel tank 26 via a fuel relief path 62. The electromagnetic relief valve 14 is structured so as to push the valve plug $14v$ to the relief valve inlet $14i$ with a spring $14s$. When the fuel pressure of the delivery pipe 2 rises to overcome the pushing force of the spring $14s$, the valve plug $14v$ is push up to allow the fuel in the delivery pipe 2 to flow back to the fuel tanks 26 via the fuel relief path 62.

When the solenoid $14e$ of the electromagnetic relief valve 14 is energized to allow an active operation of the valve plug $14v$, the electromagnetic relief valve 14 functions to adjust the fuel pressure, serving as the fuel pressure decreasing unit. The electromagnetic relief valve 14 can change the pressure of the fuel in the delivery pipe 2 by controlling the amount of actuation. For example, the electromagnetic relief valve 14 can adjust the valve opening to change the pressure of the fuel in the delivery pipe 2. Alternatively, the electromagnetic relief valve 14 may be controlled according to the ON/OFF state, for example, with the modification of duty during the ON time.

The delivery pipe 2 is provided with a fuel pressure sensor 47 which measures an internal fuel pressure. The fuel pressure sensor 47 sends signals to the engine ECU 30 which feedback controls the feed pump 12, the electromagnetic relief valve 14, or the like to allow control of the pressure of the fuel in the delivery pipe 2 to a predetermined level.

In a fuel supply system shown in FIG. 2, the electromagnetic relief valve 14 of the delivery pipe 2 is preferably attached to a most downstream position with respect to the direction of fuel flow in the delivery pipe 2 (direction shown by an arrow F in FIG. 2). When the electromagnetic relief valve 14 is open at the time of pressurizing transport of the fuel to the delivery pipe 2 via the feed pump 12, the bubbles in the fuel are also discharged into the fuel relief path 62 together with the fuel. If the electromagnetic relief valve 14 is arranged at the most downstream position in the delivery pipe 2, the accumulation of the bubbles can be suppresses, whereby the efficient discharge of bubbles from the delivery pipe 2 is allowed. Here, the electromagnetic relief valve 14 may be arranged at a position other than the most downstream position in the delivery pipe 2 in consideration of attachment of the internal combustion engine 1 to the vehicle or the layout of supplementary components. Next, the high pressure pump 10 which serves to supply the fuel into the fuel injection valve 3 will be described.

Figure 3A:
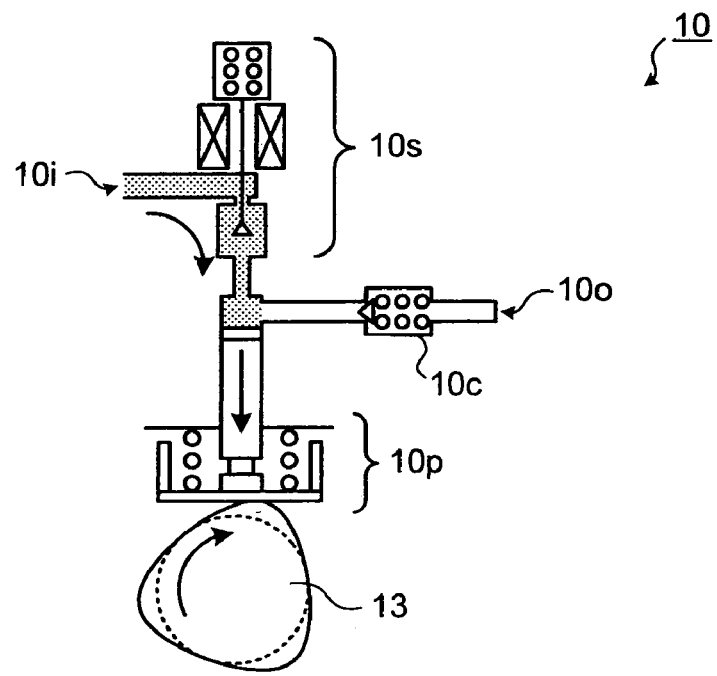
FIGS. 3A to 3D are diagrams shown to describe an operation of a high-pressure pump according to the first embodiment.
Figure 3B:
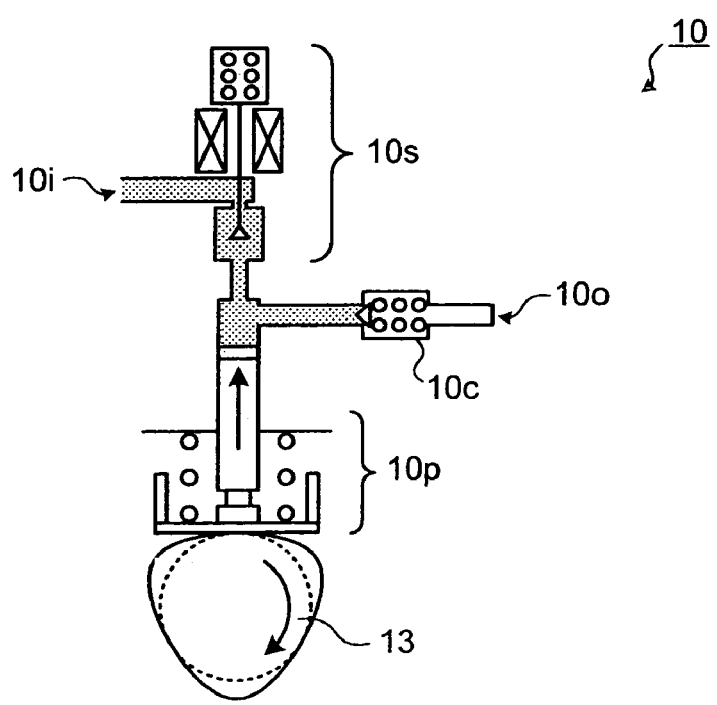
Figure 3C:
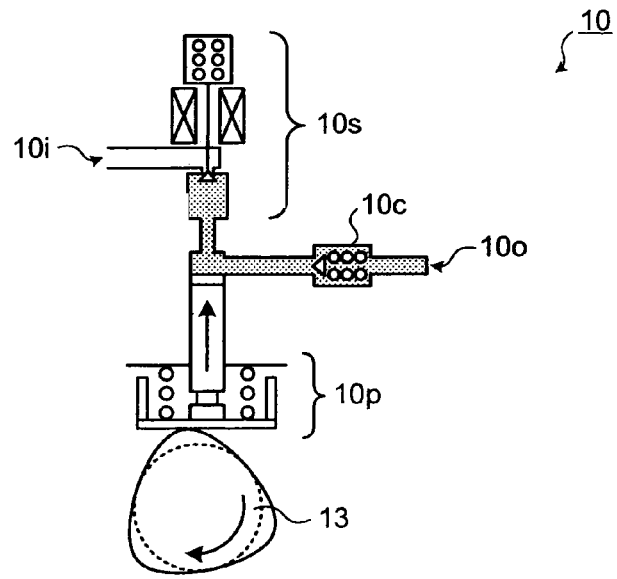

FIGS. 3A to 3D are explanatory diagrams of the operation of the high pressure pump according to the first embodiment. The high pressure pump 10 is provided with a mechanism for fuel volume/pressure control. As shown in FIGS. 3A to 3C, the high pressure pump 10 includes a spill valve 10s, a plunger 10p, and a check valve 10c. The high pressure pump 10 pressurizes the fuel by the reciprocation of the plunger 10p. The high pressure pump 10 further can control the fuel pressure and the fuel amount as necessary by closing a spill valve 10s provided at a side of a fuel intake port 10i at a most appropriate timing during the pressurization process of the high pressure pump 10. Here, the spill valve 10s may be opened/closed by electromagnetic force, and the opening/closing is controlled by control signals sent from the engine ECU 30.

Figure 3D:
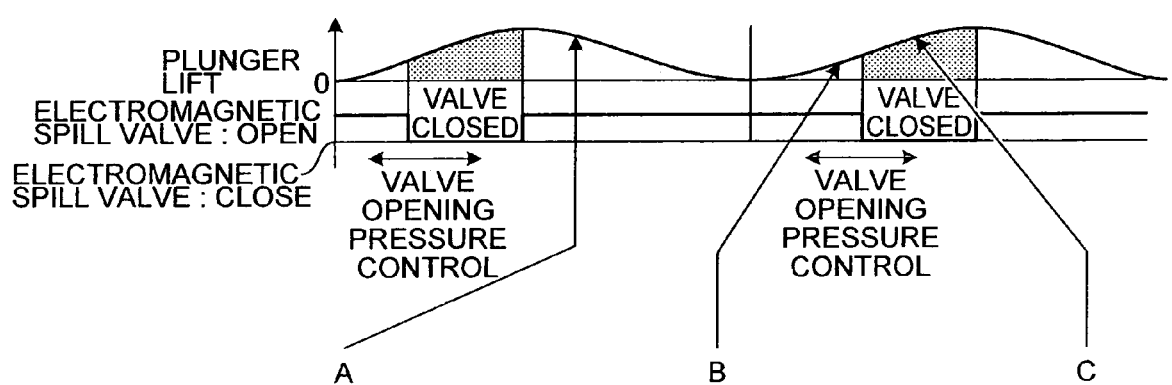

FIG. 3A shows the high pressure pump 10 where the spill valve 10s is open and the plunger 10p moves to the side of intake as a result of a stroke (the state shown in FIG. 3A corresponds to a point shown by A in FIG. 3D). FIG. 3B shows the high pressure pump 10 where the spill valve 10s is open and the plunger 10p moves to the discharge side as a result of a stroke (the state corresponds to a point shown by B in FIG. 3D). Here, the spill valve 10s is open and the discharge pressure of the plunger 10p is lower than the valve opening pressure of the check valve 10c. Hence, the fuel sucked into the plunger 10p is fed back to the fuel tank via the fuel intake port 10i. FIG. 3C shows the high pressure pump 10 where the spill valve 10s is closed and the plunger 10p moves to the discharge side as a result of a stroke (the state corresponds to a point shown by C in FIG. 3D). In this state, since the pill valve 10s is closed, the discharge pressure of the plunger 10p is higher than the valve opening pressure of the check valve 10c. Thus, the check valve 10c opens and the fuel sucked into the plunger 10p is discharged into the delivery pipe 2 via a fuel discharge port 10o.

If the spill valve 10s is closed at early timing, the effective stroke of the plunger 10p can be lengthened, whereby the fuel pressure can be increased. When such mechanism for volume/pressure control is employed, the high pressure pump 10 can change the amount of fuel to be supplied to the delivery pipe 2. Here in the embodiment, the fuel pressure in the delivery pipe 2 is determined by the valve opening pressure of the electromagnetic relief valve 14 provided in the delivery pipe 2.

Figure 4A:
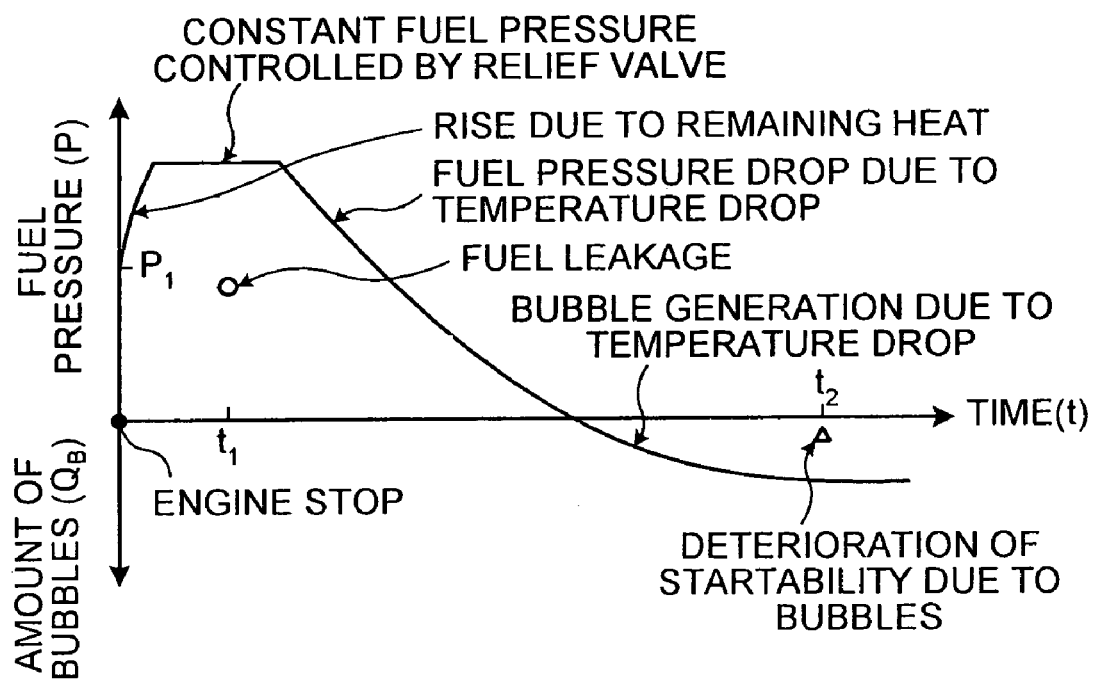
FIG. 4A is a graph shown to describe a behavior of the fuel in the delivery pipe while a conventional internal combustion engine is under suspension.
Figure 4B:
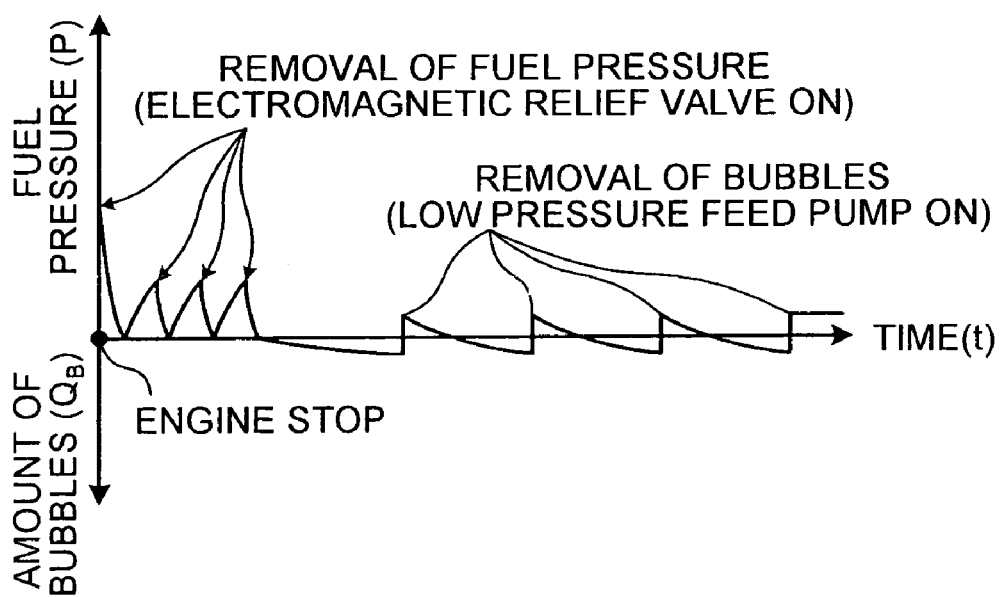
FIG. 4B is a graph shown to describe a behavior of the fuel in the delivery pipe during a suspension of an operation of an internal combustion engine to which fuel supply control according to the first embodiment is applied.

FIG. 4A is an explanatory graph shown to describe a fuel behavior in the delivery pipe in the conventional internal combustion engine under the suspension. FIG. 4B is an explanatory graph shown to describe a fuel behavior in the delivery pipe during the suspension of the internal combustion engine to which the fuel supply control of the first embodiment is applied. The vertical axis represents fuel pressure P in the delivery pipe and the amount of bubbles $Q_B$ generated in the fuel in the delivery pipe. The horizontal axis represents time t elapsed since the internal combustion engine stops to operate.

As shown in FIG. 4A, after the conventional internal combustion engine stops to operate, the fuel in the delivery pipe 2 shows temperature increase over time receiving the heat of the internal combustion engine. Then, the fuel in the delivery pipe thermally expands to cause the increase in fuel pressure P. When the fuel pressure in the delivery pipe exceeds the valve opening pressure of the relief valve, the increase stops and fuel pressure remains constant. IF the fuel pressure in the delivery pipe increases excessively, the fuel leakage may occur at the fuel injection valve at $t=t_1$, for example, to deteriorate the emission of the internal combustion engine at the restart.

After an elapse of certain time period from the start of suspension of the internal combustion engine, the temperature of the fuel in the delivery pipe starts to drop. Then, the fuel in the delivery pipe contracts to cause gradual decrease of the fuel pressure P. When the fuel pressure P drops along with the lowering fuel temperature, the fuel pressure sometimes becomes lower than the saturated vapor pressure of the fuel at a certain temperature. Then, the bubbles of fuel vapor are generated in the fuel, which amount $Q_B$ in the fuel increases over time. Then, the amount of bubbles $Q_B$ reaches the level at $t=t_2$, for example, the startability of the internal combustion engine 1 is hampered.

Contrarily, the fuel supply control of the first embodiment intermittently energizes the engine ECU 30 after the internal combustion engine stops to operate thereby activating the fuel supply controller in the engine ECU 30. When the pressure of the fuel in the delivery pipe is above a predetermined level, the electromagnetic relief valve which serves as a fuel pressure decreasing unit is made open to lower the pressure of the fuel in the delivery pipe so that the fuel leakage is at an allowable level. Thus, the degraded emission due to from the fuel leakage can be suppressed.

On the other hand, if the fuel temperature in the delivery pipe decreases, the bubbles are generated in the fuel. The fuel supply control according to the first embodiment activates the feed pump or the high pressure pump which serve as the fuel feeding units to pressurize the fuel in the delivery pipe on determining that the bubbles are generated in the fuel in the delivery pipe. Then, the bubbles can be removed through compression and liquefaction of the bubbles in the fuel, to suppress the deterioration of the startability of the internal combustion engine 1.

Here, the fuel pressure may be increased by the feed pump or the like which serves as the fuel feeding unit together with the fuel pressure decrease by the fuel pressure decreasing unit such as the electromagnetic relief valve. Then, the bubbles in the delivery pipe can be eliminated via the compression and liquefaction, while the remaining bubbles of air can be discharged out of the delivery pipe, and at the same time the fuel pressure can be increased to a predetermined level so that the fuel leakage can be suppressed to an allowable level. Thus, the suppression of the fuel leakage as well as the suppression of bubble generation can be realized. Here, the predetermined level is a level at which the amount of fuel supplied by the fuel feeding unit and the amount of fuel discharged via the fuel pressure decreasing unit are in balance. Through the adjustment of at least one of the fuel supply amount and the fuel discharge amount, the fuel pressure can be maintained at a level at which the fuel leakage is allowable. Then, the operation time of the feed pump 12 can be minimized to reduce the power consumption.

Figure 5A:
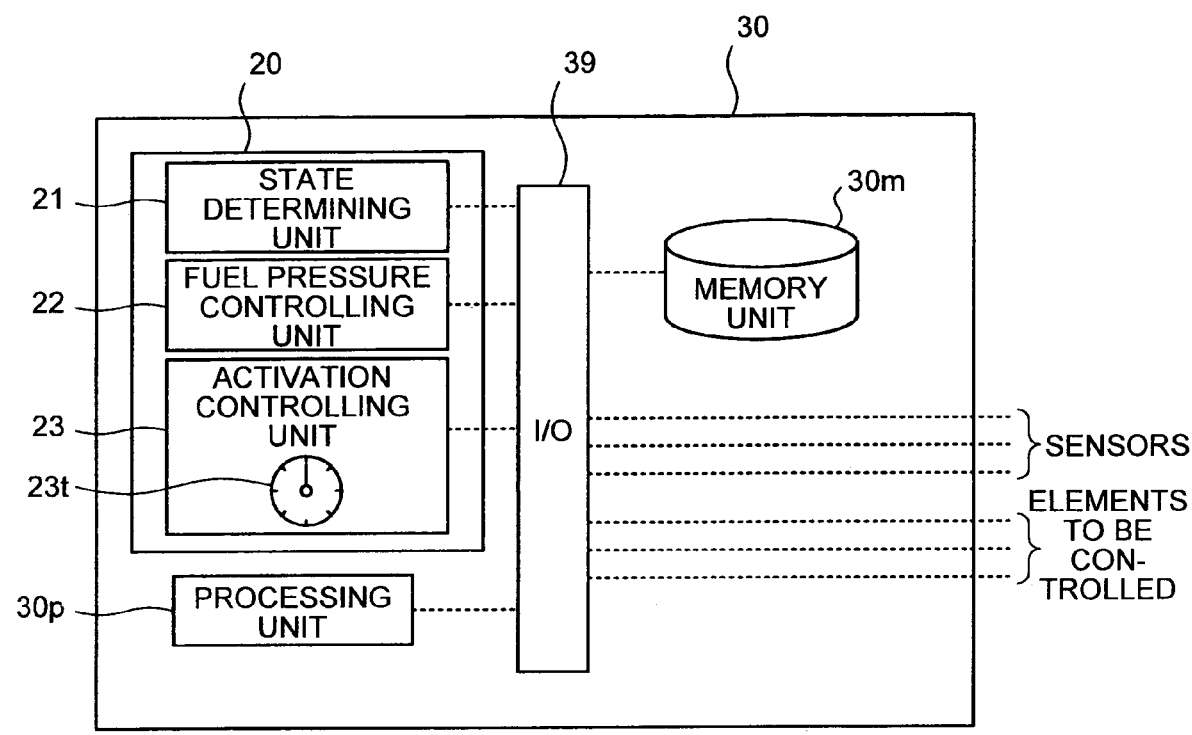
FIG. 5A is an explanatory diagram of the fuel supply controller according to the first embodiment.

FIG. 5A is an explanatory diagram of the fuel supply controller of the first embodiment. The fuel supply controller of the first embodiment can be realized with the fuel supply controller 20 of the first embodiment. The fuel supply controller 20 is incorporated into the engine ECU 30. Here, the fuel supply controller 20 may be implemented separately from the engine ECU 30 and connected thereto. When such structure is adopted, the fuel supply controller 20 may be configured so that the fuel supply controller 20 can utilize the function of the engine ECU 30 to control the internal combustion engine 1 in order to realize the operation control of the internal combustion engine according to the first embodiment.

The fuel supply controller 20 includes a state determining unit 21, a fuel pressure controlling unit 22, and an activation controlling unit 23, which together realize the operation control of the internal combustion engine according to the embodiment. The state determining unit 21, the fuel pressure controlling unit 22, and the activation controlling unit 23 are connected via an input/output (I/O) port 39 of the engine ECU 30. Thus, the state determining unit 21 and the fuel pressure controlling unit 22 can exchange data interactively. Data transmission may be realized unidirectionally as necessary according to the design consideration (the same applies to the description below).

The activation controlling unit 23 is provided with a timer 23t which serves as an activation controlling unit. When the process related with the operation of the internal combustion engine 1 is completed and the fuel supply controller 20 is to be stopped, data of a time of next activation is given to the timer 23t. When the time for next activation comes, the timer 23t activates the fuel supply controller 20 by energizing the same. Thus, the intermittent activation of the fuel supply controller 20 is allowed. Since the fuel supply controller 20 is structured as a part of the engine ECU 30, intermittent activation and suspension of the operation of the fuel supply controller 20 may be realized through the activation and suspension of the operation of the engine ECU 30 as a whole.

Figure 5B:
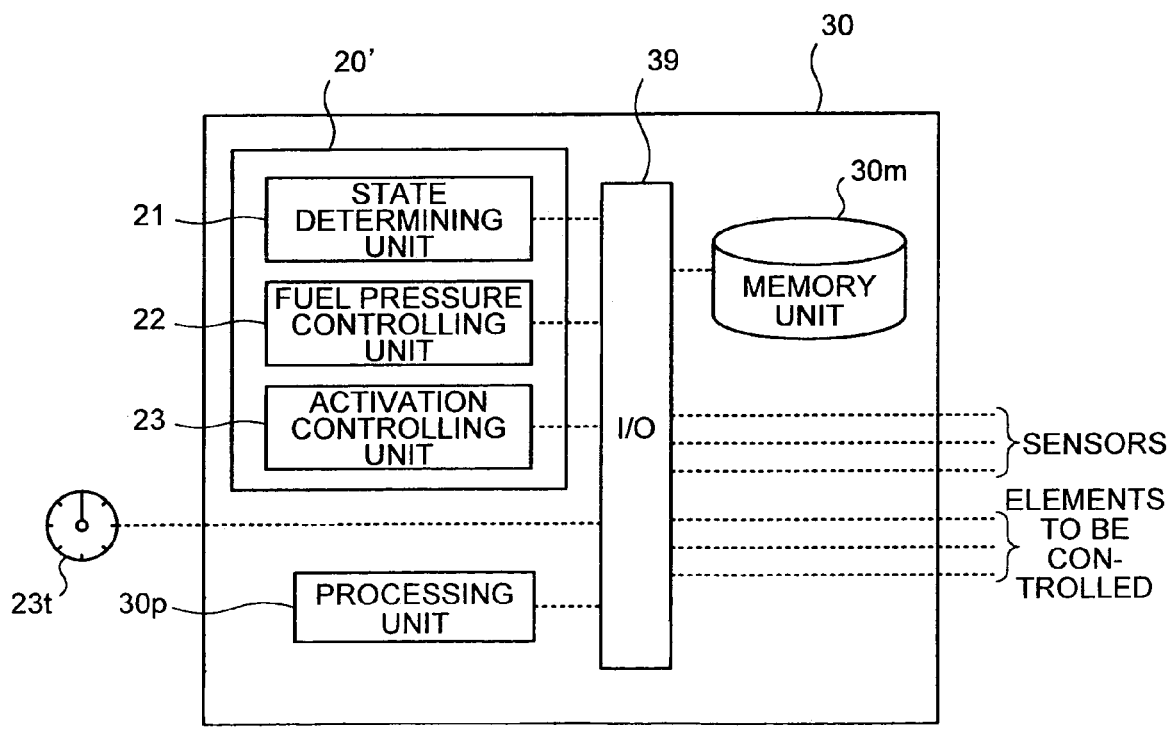
FIG. 5B is an explanatory diagram of another example of the fuel supply controller according to the first embodiment.

FIG. 5B is an explanatory diagram of another example of the fuel supply controller according to the first embodiment. The fuel supply controller 20 is structured as to include the timer 23t in the activation controlling unit 23 in the above example. The timer 23t, however, may be arranged outside the engine ECU 30 as shown by a fuel supply controller 20'. In the fuel supply-controller 20', the activation controlling unit 23 is attached outside the engine ECU 30.

Here, the timer 23t is connected to the input/output (I/O) port 39 of the engine ECU 30, to allow the data exchanges with the state determining unit 21, the fuel pressure controlling unit 22, a processing unit 30p, or the like. The fuel supply controller with such arrangement can function as the fuel supply controller of the first embodiment. Alternatively, the activation controlling unit 23 may be provided inside the engine ECU 30 and the activation controlling unit 23 is connected to the IO port 39 of the engine ECU 30.

The fuel supply controller 20, is connected via the I/O port 39 of the engine ECU 30 to the processing unit 30p and a memory unit 30m of the engine ECU 30, to allow data exchanges among these elements. Thus, the fuel supply controller 20 can acquire data for operation control of the internal combustion engine, such as the load, the number of rotations, or the like of the internal combustion engine 1 stored by the engine ECU 30, and further, the fuel supply controller 20 can interrupt operation control routine of the internal combustion engine of the engine ECU 30 to control the fuel supply controller 29.

The I/O port 39 is connected to sensors for acquiring information on the operation of the internal combustion engine 1, such as the crank angle sensor 41, the accelerator opening sensor 42, the air flow sensor 43, the cooling water temperature sensor 44, the intake temperature sensor 45, and the $O_2$ sensor 46. Thus, the engine ECU 30 and the fuel supply controller 20 can acquire necessary information for the operation control of the internal combustion engine 1. In addition, the I/O port 39 is connected to the object to be controlled by the internal combustion engine 1, such as the high pressure pump 10. The fuel pressure controlling unit 22 of the fuel supply controller 20, and the control signals from the processing unit 30p of the engine ECU 30 serve to control the operation thereof.

The memory unit 30m stores a computer program of processing sequences of a method of controlling the operation of the internal combustion engine according to the first embodiment, data map of the amount of injected fuel and the like for the operation control of the internal combustion engine 1, for example. Here, the memory unit 30m may be structured with a volatile memory such as a random access memory (RAM), a non-volatile memory such as a flash memory, or a combination thereof. The fuel supply controller 20 and the processing unit 30 of the engine ECU 30 may be structured with a memory and a central processing unit (CPU).

The computer program mentioned above may realize the processing sequence of the fuel supply control according to the embodiment with a combination of computer programs previously recorded in the elements such as the state determining unit 21 and the fuel pressure controlling unit 22. The fuel supply controller 20 may realize the function of the elements such as the state determining unit 21 and the fuel pressure controlling unit 22 with a dedicated hardware instead of the computer program mentioned above. Next, process sequences to realize the method of controlling the operation of the internal combustion engine according to the first embodiment will be described with the fuel supply controller 20 as an example, with reference to FIGS. 1 to 5A and 5B.

Figure 6:
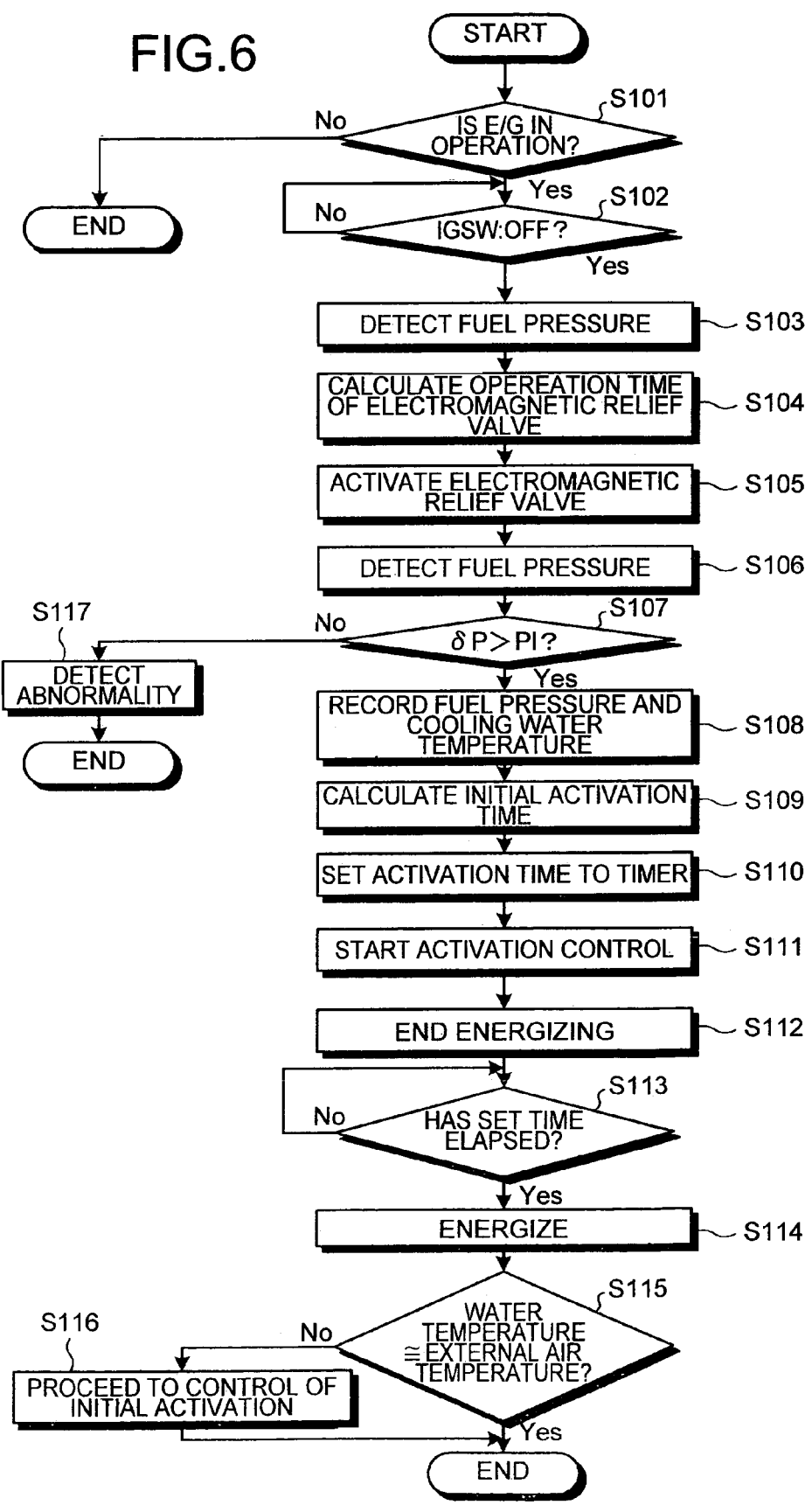
FIG. 6 is a flowchart of fuel supply control according to the first embodiment.
Figure 7A:
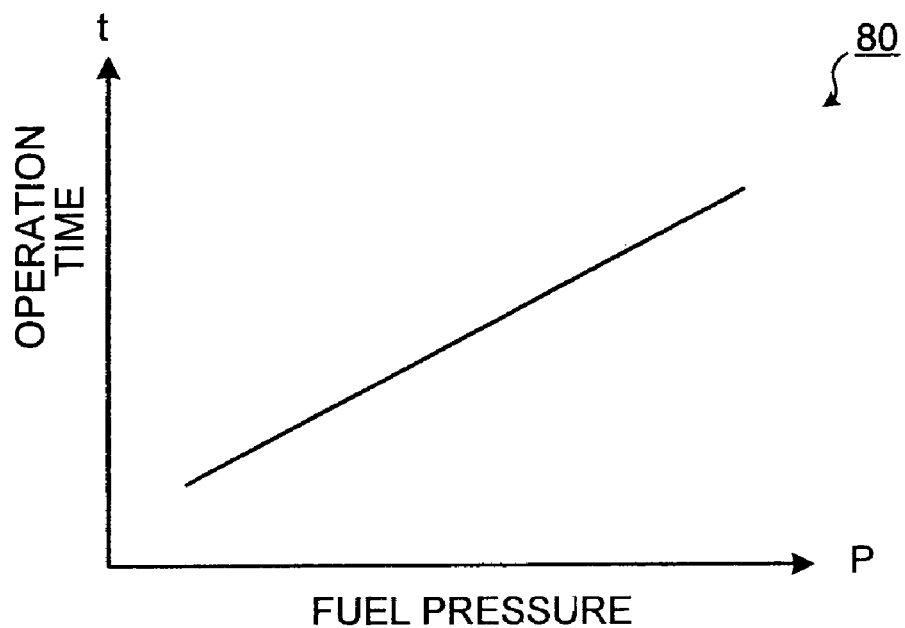
FIG. 7A is a graph of an example of a map employed to calculate an operation time of an electromagnetic relief valve.

FIG. 6 is a flowchart of a sequence of the fuel supply control according to the first embodiment. FIG. 7A is an explanatory diagram of an example of an initial activation time calculation mapping of the fuel supply controller. A condition for performing the fuel supply control according to the embodiment is: that the internal combustion engine (E/G) is under suspension; and that an ignition switch (IGSW) of the internal combustion engine 1 is OFF. The processing unit 30p of the engine ECU 30 first determines whether the internal combustion engine 1 is in operation or not (step S101).

When the processing unit 30p determines that the internal combustion engine 1 is not in an operation (No in step S101), the fuel supply control of the embodiment ends. When the processing unit 30p determines that the internal combustion engine 1 is in operation (Yes in step S101), and the IGSW is ON (No in step S102), the processing unit 30p of the engine ECU 30 continues to monitor the IGSW until the IGSW is turned OFF.

When the IGSW is turned OFF (Yes in step S102), the internal combustion engine 1 can be determined to have stopped the operation. Then, the sequence moves to the fuel supply control of the embodiment. The processing unit 30p of the engine ECU 30 turns a fuel supply control transition flag F1=1. The fuel supply controller 20 recognizing the fuel supply control transition flag F1=1 performs the fuel supply control according to the first embodiment.

The state determining unit 21 of the fuel supply controller 20 detects fuel pressure P in the delivery pipe 2 from the fuel pressure sensor 47 provided in the delivery pipe 2 (step S103). The fuel pressure controlling unit 22 supplies the fuel pressure P to an electromagnetic relief valve operation time calculating map 80, calculates the operation time of the electromagnetic relief valve 14 which serves as the fuel pressure decreasing unit (step S104), and activates the electromagnetic relief valve 14 for the calculated operation time (step S105). The fuel pressure P in the delivery pipe 2 is preferably maintained in a range of fuel pressure Pp where the fuel leakage from the fuel injection valve 3 can be accommodated so that the emission at the start-up of the internal combustion engine 1 does not deteriorate.

The operation time of the electromagnetic relief valve 14 is determined so that the fuel pressure P in the delivery pipe 2 is equal to the fuel pressure Pp. As shown in the electromagnetic relief valve operation time calculating map 80, the higher the fuel pressure P, the longer operation time of the electromagnetic relief valve 14 contributes to securely lower the fuel pressure in the delivery pipe 2 to the allowable range of the fuel leakage. The electromagnetic relief valve operation time calculating map 80 is formulated based on the previous measurement of the operation time of the electromagnetic relief valve 14 required to change the level of the fuel pressure from the level P prior to the activation of the electromagnetic relief valve 14 to the level of Pp.

Instead of employing the electromagnetic relief valve operation time calculating map 80, the fuel pressure controlling unit 22 may control the electromagnetic relief valve 14 so that the fuel pressure controlling unit 22 acquires the output from the fuel pressure sensor 47 while opening the electromagnetic relief valve 14, whereas closing the electromagnetic relief valve 14 when the pressure detected by the fuel pressure sensor 47 attains the level of Pp. With such control, the operation time of the electromagnetic relief valve 14 can be minimized as far as possible. As a result, the energizing of the electromagnetic relief valve 14 is not frequently required, whereby the power consumption by the electromagnetic relief valve 14 can be suppressed.

After the activation of the electromagnetic relief valve 14 for the determined operation time derived from the electromagnetic relief valve operation time calculating map 80, the state determining unit 21 measures the fuel pressure in the delivery pipe 2 after the decrease of the fuel pressure by the fuel pressure sensor 47 in the delivery pipe 2 (step S106). If the fuel pressure variation dP=|P−Pp| is larger than a predetermined value P1 (Yes in step S107), the fuel pressure sensor 47 and the electromagnetic relief valve 14 are determined to operate properly. If dP≦P1 (No in step S107), it can be determined that at least one of the fuel pressure sensor 47 and the electromagnetic relief valve 14 is not properly working (step S117). Then, an alarm lamp 71 of a display panel 70 (see FIG. 2) is turned on to prompt check and repair, or an abnormality detection log is stored in the memory unit 30m of the engine ECU 30 to be utilized for identification of the defect portion.

Figure 7B:
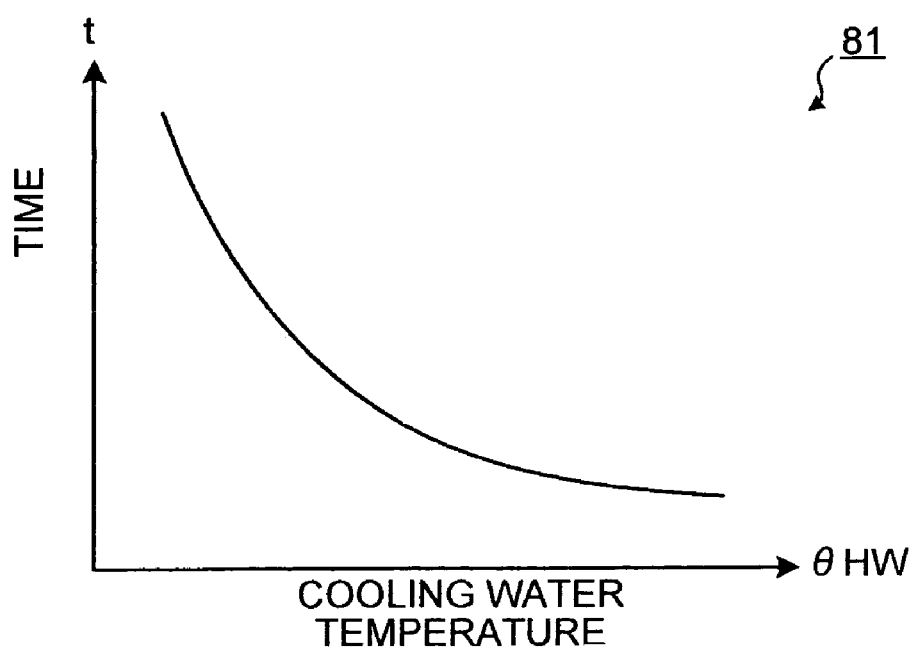
FIG. 7B is a graph of an example of a map employed to calculate a time required for an initial activation of the fuel supply controller.

If dP>P1 (Yes in step S107), the sequence proceeds to setting of reactivation time. The activation controlling unit 23 acquires fuel pressure P0 in the delivery pipe 2 from the fuel pressure sensor 47, acquires cooling water temperature θHW0 of the internal combustion engine 1 from the cooling water temperature sensor 44 of the internal combustion engine 1, and stores the data in the memory unit 30m of the engine ECU 30 (step S108). Then, the activation controlling unit 23 calculates initial activation time TW0 which is a timing of the initial activation of the fuel supply controller 20, using the acquired data of the cooling water temperature θHW0 (step S109). The activation controlling unit 23 can calculate the timing of the initial activation by mapping the acquired data of the cooling water temperature θHW0 into an initial activation time calculating map 81 shown in FIG. 7B. As shown in the initial activation time calculating map 81, the fuel leakage can be suppressed by setting the short initial activation time for the higher cooling water temperature θHW0, thereby lowering the fuel pressure in the delivery pipe 2 earlier. Thus, with the reactivation of the fuel supply controller 2 at most appropriate timing in accordance with the cooling water temperature θHW0, the reduction in power consumption is allowed.

Next, the activation controlling unit 23 sets the calculated initial activation time to the timer 23t (TW=TW0, in step S110). Then the activation controlling unit 23 sends a direction to start control to the timer 23t, thereby starting the activation control using the timer 23t (step S111). The activation control will be described later. The activation controlling unit 23 ends the energizing of the fuel supply controller 20 and the engine ECU 30 (in step S112). In the first embodiment, since the fuel supply controller 20 is provided in the engine ECU 30, the energizing of the fuel supply controller 20 ends with the end of energizing of the engine ECU 30.

The timer 23t continues counting up until the set initial activation time passes (No in step S113). When the set initial activation time elapses (Yes in step S113), the timer 23t energizes the fuel supply controller 20 and the engine ECU 30 (in step S114) to activate the same. The state determining unit acquires the data of cooling water temperature θHW1 of the internal combustion engine 1 at the initial activation from the cooling water temperature sensor 44 of the internal combustion engine 1, and acquires data on external air temperature θO1 from an external air temperature sensor 48 (see FIG. 2). If the cooling water temperature θHW1 is higher than the external air temperature θO1 (θHW1>θO1) as a result of comparison (No in step S115), the sequence proceeds to a second fuel supply control (step S116). The second fuel supply control is, a fuel supply control for a first reactivation of the fuel supply controller 20 and the engine ECU 30 after the suspension of the internal combustion engine 1. If the cooling water temperature θHW1~ external air temperature θO1 (Yes in step S115), it can be determined that the fuel temperature in the delivery pipe 2 does not show substantial changes. In other words, it can be determined that there is no significant generation of bubbles or the increase in the fuel pressure. Thus, the fuel supply control according to the first embodiment ends.

Next, the activation control with the timer 23t will be described. FIG. 8 is a flowchart of a process sequence of the activation control with the timer. The activation control with the timer 23t starts when the timer 23t receives the direction to start the control from the activation controlling unit 23 (step S111). When the timer 23t receives the direction to start control, a timer counter is reset. More specifically, count value TWC is set to zero (TWC=0) (step S201). The counting by the timer 23t starts under the condition that the fuel supply controller 20 and the engine ECU 30 are not energized (Yes in step S202) and that the activation time TW is set (Yes in step S203). When one of these conditions are not met (No in step S202 or No in step S203), the counting up does not begin.

When the counting starts, the count value TWC increments one by one (step S204). The counting up continues until the count value TWC exceeds the activation time TW (No in step S205). When the count value TWC exceeds the activation time TW (Yes in step S205), the timer 23t energized the fuel supply controller 20 and the engine ECU 30 to activate the same (step S206), and the activation control with the timer 23t ends. Next, the process starting from the second fuel supply control will be described.

Figure 9:
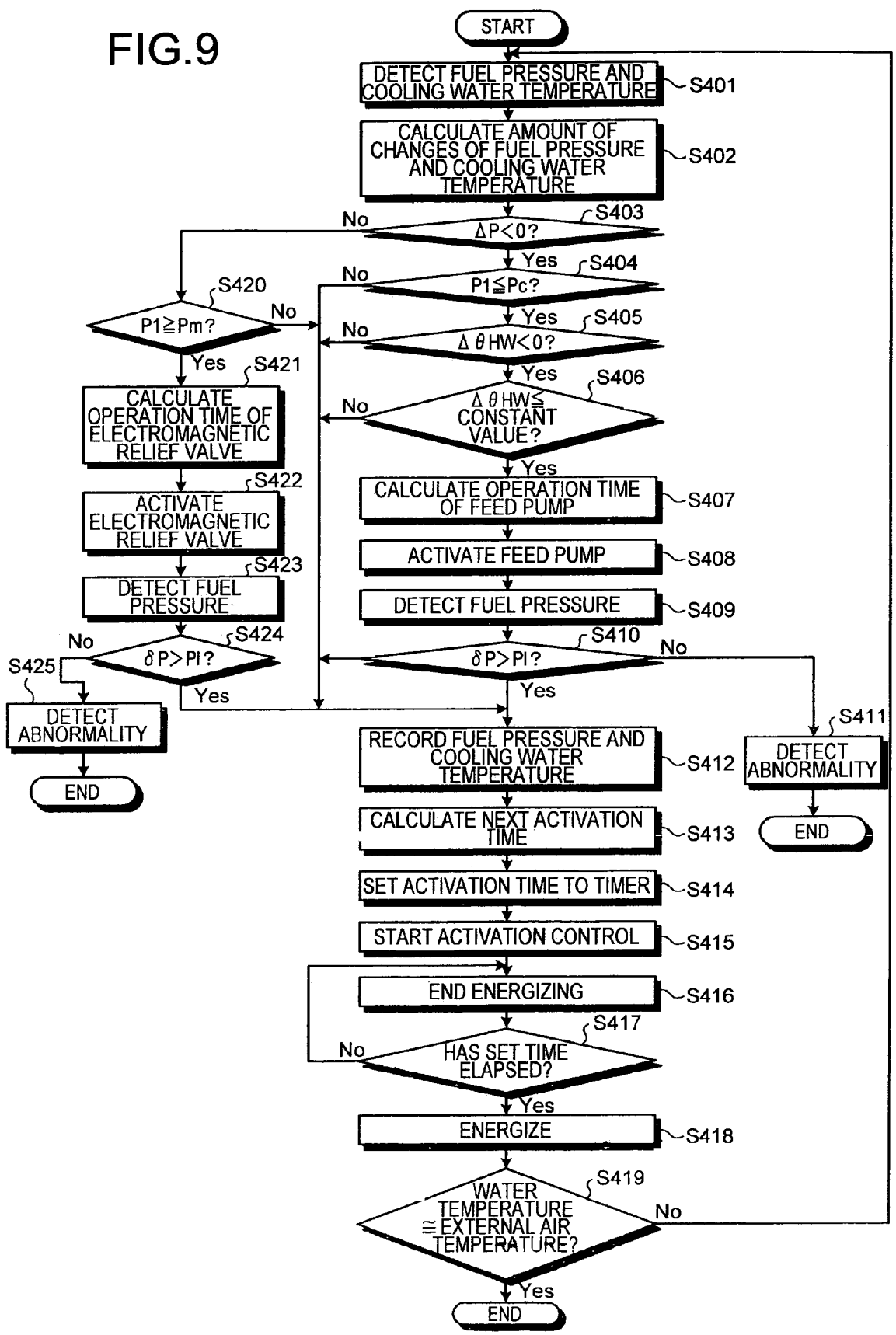
FIG. 9 is a flowchart of fuel supply control according to the first embodiment.
Figure 10:
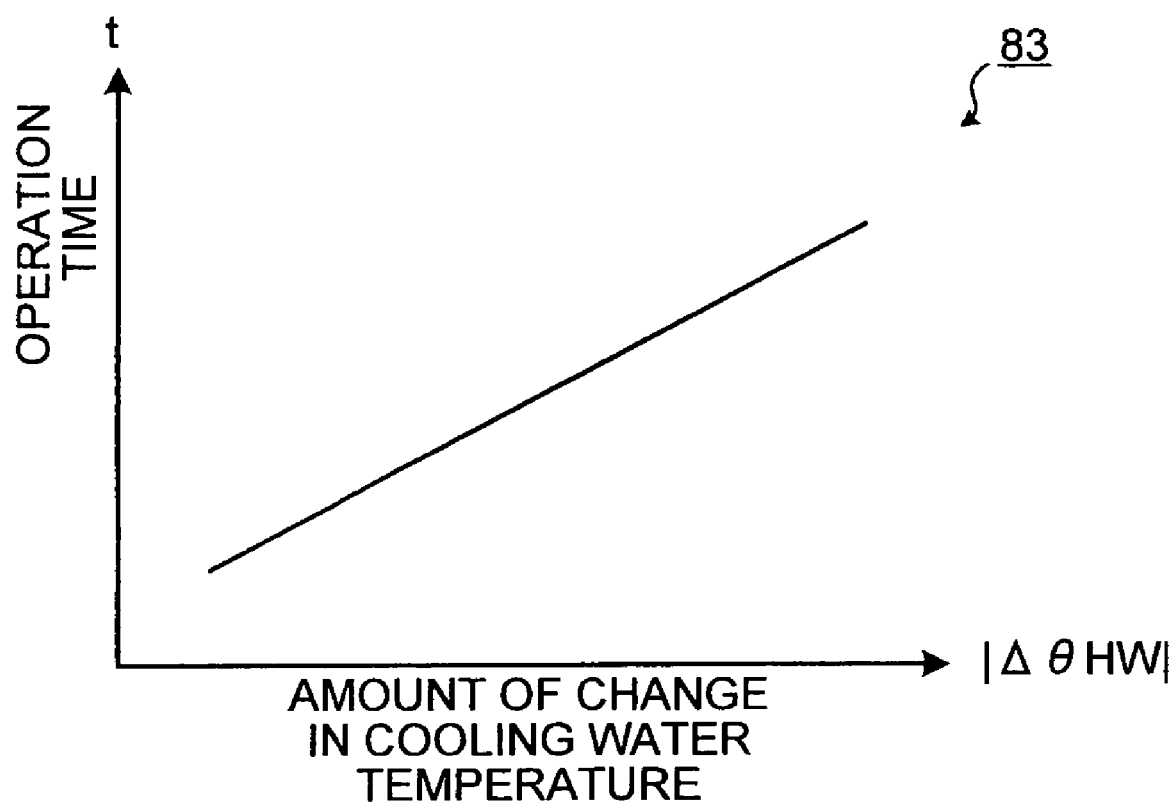
FIG. 10 is a graph of an example of a map employed to determine an operation time of a feed pump.

FIG. 9 is a flowchart of a sequence of the fuel supply control according to the first embodiment. FIG. 10 is an explanatory diagram of an example of a map to determine the activation time of the feed pump. To perform the second fuel supply control (first after the activation of the fuel supply controller), the activation controlling unit 23 acquires data on fuel pressure P1 in the delivery pipe 2 from the fuel pressure sensor 47, acquires cooling water temperature θHW1 of the internal combustion engine from the cooling water temperature sensor 33 of the internal combustion engine 1 (step S401), and stores the acquired data in the memory unit 30m of the engine ECU 30.

Next, the state determining unit 21 calculates the amounts of changes of the fuel pressure and the cooling water temperature (step S402). The amounts of changes can be found based on the fuel pressure P0 and the cooling water temperature θHW0 acquired at the previous control. In other words, the amounts of changes can be represented as ΔP=P1−P0 and ΔθHW=θHW1−θHW0 respectively for the fuel pressure and the cooling water temperature. When these formulae are generalized, they can be represented as ΔP=P(n)−P(n−1), and ΔθHW=θHW(n)−θHW0(n−1) (here, n is a natural number).

If the amount of changes in the fuel pressure ΔP is smaller than zero (Yes in Step S403), the fuel pressure of the current time P1 is equal to or smaller than the saturated vapor pressure Pc (Yes in step S404), the amount of changes of the cooling water temperature ΔθHW is smaller than zero (Yes in step S405), and the amount of changes in the cooling water temperature ΔθHW is equal to or smaller than a predetermined amount (Yes in step S406), the fuel pressure controlling unit 22 calculates the activation time of the feed pump 12 (in step S407). Here, Pc is a level of saturated vapor pressure of the fuel calculated based on the temperature of the fuel in the delivery pipe 2.

If the fuel pressure P1 of the current time is lower than the saturated vapor pressure Pc (No in step S404), the amount of changes in the cooling water temperature ΔθHW is larger than zero (No in step S405), and the amount of changes in the cooling water temperature ΔθHW is larger than a predetermined amount (No in step S406), the conditions for the adjustment of the fuel pressure in the delivery pipe 2 are not met. Then, the sequence proceeds to step S412 where the activation control starts.

If the fuel pressure in the delivery pipe 2 is equal to or lower than the saturated vapor pressure Pc, the fuel pressure P in the delivery pipe 2 and the cooling water temperature ΔθHW of the internal combustion engine 1 are on the decline, and the amount of changes in the cooling water temperature ΔθHW is equal to or smaller than a predetermined amount, it can be determined that the amount of bubbles in the delivery pipe would hamper the rise in fuel pressure at the restart of the internal combustion engine 1. Here, if at least the fuel pressure in the delivery pipe 2 is equal to or lower than the saturated vapor pressure Pc of the fuel in the delivery pipe 2 and the fuel pressure P in the delivery pipe 2 and the cooling water temperature θHW of the internal combustion engine 1 are on the decline, it can be determined that the amount of bubbles in the delivery pipe hampers the rise in fuel pressure at the restart of the internal combustion engine 1.

Then, the activation time of the feed pump 12 is calculated from the mapping of the absolute value of the amount of changes in the cooling water temperature |ΔθHW| into a feed pump activation time determination map 83 shown in FIG. 10. A larger value of the absolute value of the amount of changes in the cooling water temperature |ΔθHW| denotes a large drop in the cooling water temperature, hence, suggests the increase in the generation of bubbles in the contracted fuel in the delivery pipe 2.

The map 83 for determining the feed pump activation time can be formulated based on the measurements taken in advance of time required for the compression and liquefaction of the bubbles generated in the fuel in the delivery pipe 2 in association with the absolute values of the amount of changes in the cooling water temperature |ΔθHW| under various conditions. Instead of employing the feed pump activation time determination map 83, the fuel pressure controlling unit 22 may activate the feed pump 12 while acquiring the output from the fuel pressure sensor 47, to maintain the activation of feed pump 12 until the pressure detected by the fuel pressure sensor 47 starts to rise. Then, since the feed pump 12 is activated only while the bubbles in the delivery pipe 2 is being removed up to a necessary range, excessive energizing of the feed pump 12 does not occur. Thus, the power consumption by the feed pump 12 can be reduced.

When the fuel pressure controlling unit 22 calculates the activation time of the feed pump (in step S407), the fuel pressure controlling unit 22 activates the feed pump 12 for the determined activation time (step S408). Thereafter, the state determining unit 21 measures the fuel pressure in the delivery pipe 2 after the decrease in the fuel pressure with the fuel pressure sensor 47 of the delivery pipe 2 (step S409). If the amount of changes in the fuel pressure dP=|P2−P1| is larger than a predetermined amount P1 (Yes in step S410), it can be determined that the fuel pressure sensor 47 and the feed pump 12 are properly operating and no leakage happens in the fuel pipe system.

If dP=P1 (No in step S410), it can be determined that at least one of the fuel pressure sensor 47 and the feed pump 12 is not properly operating, or that abnormality such as leakage occurs in the fuel pipe system (step S411). In such case, the transport of the fuel into the delivery pipe 2 through pressurization may cause the leakage of the fuel. Hence, the alarm lamp 71 (see FIG. 2) of the display panel 70 may be lighted up to prompt the check and repair, or the abnormality is recorded as the abnormality detection log in the memory unit 30m of the engine ECU 30 to be utilized for the identification of the defective portion.

If dP>P1 (Yes in step S410), the sequence proceeds to the reactivation time setting. The activation controlling unit 23 acquires data on fuel pressure P2 in the delivery pipe 2 from the fuel pressure sensor 47, acquires data on cooling water temperature θHW2 of the internal combustion engine 1 from the cooling water temperature sensor 44 of the internal combustion engine 1, and stores the acquired data in the memory unit 30m of the engine ECU 30 (in step S412). Then, the activation controlling unit 23 calculates activation time TW1 used for the next activation of the fuel supply controller 20 based on either the previously acquired data on fuel pressure P0 and the data on fuel pressure acquired prior to the start of the current control P1, or the previously acquired data on cooling water temperature θHW0 and data on cooling water temperature acquired prior to the start of the current control θHW1 (step S413). The sequence will be described next.

Figure 11A:
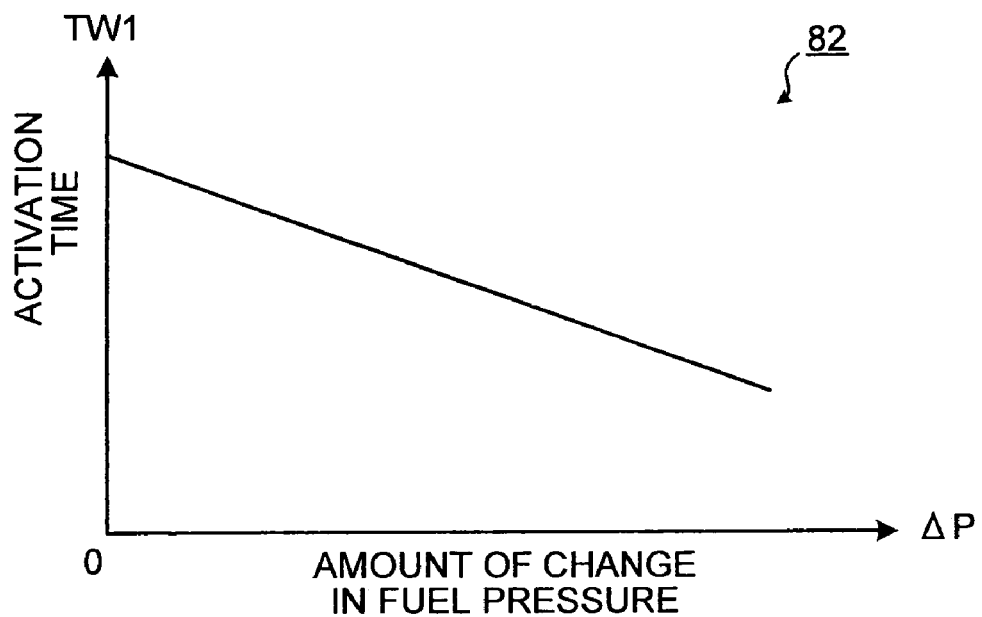
FIGS. 11A and B are graphs of an example of a map employed to calculate a next activation time.
Figure 11B:
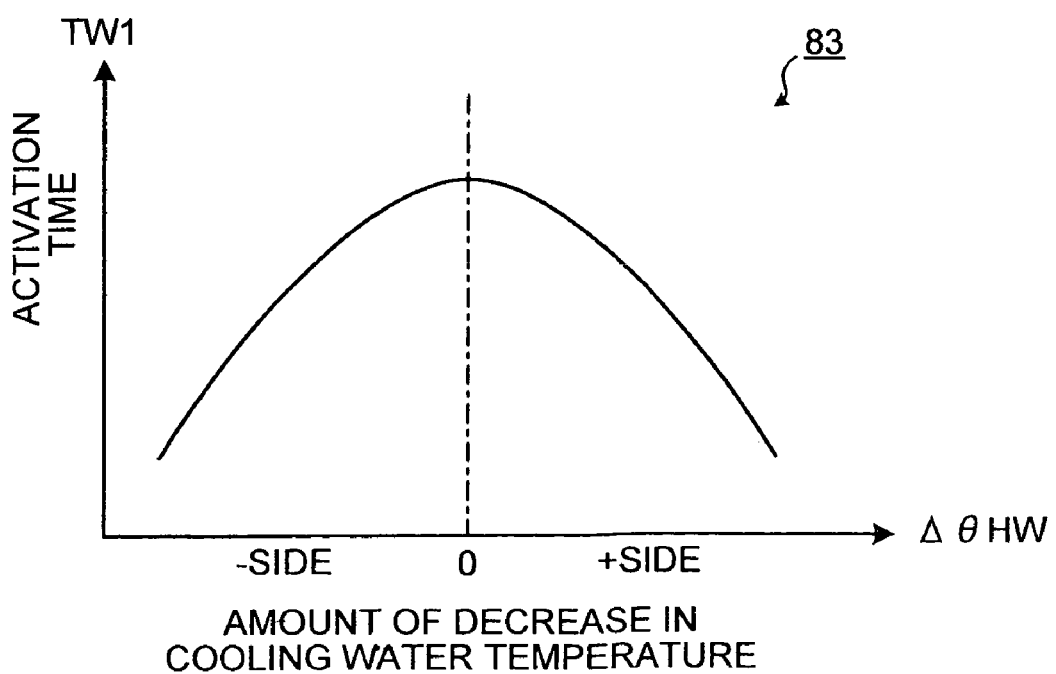

FIGS. 11A and 11B are explanatory graphs of an example of a map employed for the calculation of time for next activation. At the activation of the fuel supply controller 20 from the second time, first and second next activation time calculation maps 82 and 83 are employed. The map to be used is chosen based on the magnitude of the amount of changes in fuel pressure ΔP=P1−P0. When ΔP>0, the fuel pressure in the delivery pipe 2 is increasing. Then, the first next activation time calculation map 82 is employed, and next activation time TW1 is found by mapping the amount of changes ΔP of the fuel pressure into the map 82. The first next activation time calculation map 82 is formulated so that the larger amount of changes ΔP in the fuel pressure corresponds with shorter time interval for reactivation of the fuel supply controller 20 or the like. Thus, when the rise in the fuel pressure is steep, the electromagnetic relief valve 14 can be activated at short time intervals to prevent the fuel leakage. Further, since the electromagnetic relief valve 14 is activated in a smallest possible range, the reduction in power consumption is also allowed.

When ΔP=0, the fuel pressure in the delivery pipe 2 is on the decline, which means that the bubbles are likely to be generated in the fuel in the delivery pipe 2. In such case, the fuel supply controller 20 or the like is reactivated according to the cooling water temperature of the internal combustion engine 1. Hence, next activation time TW1 is found from the second next activation time calculation map 83 with the mapping of ΔθHW=θHW1−θHW0 therein.

The fact that the amount of changes in the cooling water temperature is large in the negative direction means that the temperature drop of the fuel in the delivery pipe 2 is also large. Then, along with the drop of the saturated vapor pressure, the bubbles are likely to be generated in the contracted fuel. On the contrary, the fact that the amount of changes in the cooling water temperature is large in the positive direction means that the temperature rise of the fuel in the delivery pipe 2 is also large. Then, the fuel leakage is likely to happen due to the expansion of the fuel. On the other hand, if the amount of changes in the fuel temperature is not significant, the fuel leakage nor the bubble generation is not likely to happen. Thus, the second next activation time calculation map 83 is formulated so that the smaller amount of changes in the cooling water temperature ΔθHW corresponds with longer time interval for the reactivation of the fuel supply controller 20 or the like. Thus, if the changes in the cooling water temperature is steep, the feed pump 12 or the electromagnetic relief valve 14 can be activated at shorter intervals, to suppress the bubble generation or the fuel leakage. In addition, since the feed pump 12 or the like is activated in the smallest possible range, reduction in power consumption is also allowed.

At the calculation of the next activation time TW1 (step S413), the next activation time TW1 may be corrected according to the external air temperature. Since the changes in the fuel pressure and the cooling water temperature of the internal combustion engine 1 are affected by the atmospheric temperature, the correction is preferable. For example, if the external air temperature is low, the cooling water temperature tends to drop accordingly, which in turn makes the changes in the fuel pressure in the delivery pipe 2 more likely to happen. Hence, if the next activation time TW1 is corrected according to the external air temperature at the calculation, more precise control is allowed. When the external air temperature is high, for example, since the amount of changes in the fuel pressure ΔP becomes larger, the gradient or the like of the first next activation time calculation map 82 may be corrected so that the reactivation is performed at shorter intervals than when the external air temperature is lower.

With the correction of the next activation time TW1 based on the external air temperature, the bubbles in the fuel can be more surely removed to allow the improvement in the startability of the internal combustion 1 and the reduction in the fuel leakage. Further, since the fuel pressure in the delivery pipe 2 can be controlled at more precise timing, the power consumption by the drives of the feed pump 12, and the electromagnetic relief valve 14 can be suppressed. After the activation controlling unit 23 calculates the next activation time TW1 for the next activation of the fuel supply controller 20 (step S413), the timer 23t is set to the activation time (step S414), and the activation control starts (step S415). The following steps S416 to step S418 are same with the above-described steps S112 to S114. Hence the description thereof will not be repeated.

After the activation of the fuel supply controller 20 and the engine ECU 20 (step S418), the state determining unit acquires cooling water temperature θHW1 of the internal combustion engine 1 at the initial activation from the cooling water temperature sensor 44 of the internal combustion engine 1, and acquires the external air temperature θO1 from the external air temperature sensor 48 (see FIG. 2). If the cooling water temperature θHW1 is higher than the external air temperature θO1 (θHW1>θO1), as a result of comparison (No in step S419), the sequence proceeds to a third fuel supply control. If the cooling water temperature θHW1 is nearly equal to the external air temperature θO1 (θHW1~θO1) (Yes in step S419), it can be determined that the fuel temperature in the delivery pipe 2 does not change substantially. In other words, it can be determined that no significant generation of bubble or the increase in the fuel pressure do not occur. Then, the fuel supply control according to the first embodiment ends. Next, return to step S403 subsequent sequence will be described.

When the amount of changes in the fuel pressure ΔP is equal to or larger than zero (No in step S403), the state determining unit 21 determines whether fuel pressure P1 in the delivery pipe 2 is equal to or larger than a predetermined pressure Pm (step S420). The predetermined pressure Pm here is at a level higher than or equal to the minimum required operation fuel pressure and the saturated vapor pressure of the fuel determined by the temperature. Further, the predetermined pressure Pm is preferably equal to or higher than a pressure resulting in the degraded emission due to the fuel leakage. When the fuel pressure for the operation of the electromagnetic relief valve 14 is determined as described above, the electromagnetic relief valve 14 can be operated in an appropriate required range, whereby the effective suppression of the fuel leakage and the power consumption are allowed.

If P1<Pm (No in step S420), the condition for operating the electromagnetic relief valve 14 is not met, and the sequence proceeds to step S412 for activation control. If P1=Pm (Yes in step S420), the fuel pressure controlling unit 22 calculates operation time of the electromagnetic relief valve 14 (step S421). The operation time of the electromagnetic relief valve 14 is set so that the fuel pressure in the delivery pipe 2 is equal to or lower than the range expected to cause degraded emission via the fuel leakage. For example, the time required for the fuel pressure to reach a target level is measured in advance prior to the activation of the electromagnetic relief valve, and arranged as a map. The activation time can be calculated based on the map. Alternatively, the fuel pressure sensor 47 may measure the fuel pressure in the delivery pipe 2 as the electromagnetic relief valve 14 is opening, and energizing of the electromagnetic relief valve may be stopped when the fuel pressure reaches the target level. Since the operation time of the electromagnetic relief valve 14 can be suppressed to minimum possible level in either manner, the suppression in fuel leakage as well as the power consumption is allowed.

After the determination of the operation time of the electromagnetic relief valve 14, the fuel pressure controlling unit 22 operates the electromagnetic relief valve 14 until the calculated operation time passes or the fuel pressure in the delivery pipe 2 reaches the target fuel pressure (step S422). Thereafter, the state determining unit 21 measures fuel pressure P2 in the delivery pipe 2 (step S423). If the amount of changes of the fuel pressure dP=|P2−P1| is larger than predetermined value P1 (Yes in Step S424), it can be determined that the fuel pressure sensor 47 and the electromagnetic relief valve 14 are properly working.

If dP=P1 (No in step S424), it can be determined that at least one of the fuel pressure sensor 47 and the electromagnetic relief valve 14 is not working properly (step S425). Then, the alarm lamp 71 of the display panel 70 (see FIG. 2) is lighted up to prompt check and repair, or the abnormality detection log is recorded in the memory unit 30m of the engine ECU 30 to be utilized for identification of the defective portion.

Through the repetition of the sequence described above, the adjustment of the fuel pressure in the delivery pipe 2 is performed for the reduction of generated bubbles and the suppression of fuel leakage. Thus, a swift increase in the fuel pressure in the delivery pipe 2 at the start-up of the internal combustion engine can be achieved for the improvement of startability. Here, if the characteristics of fuel pressure increase in the delivery pipe 2 at the start-up of the internal combustion engine 1 changes from the expected characteristics after the above-described control has been done, the operation condition or the operation time of the feed pump 12 may be modified so that the characteristics can be checked anew.

For example, if the time required for the fuel pressure rise in the delivery pipe 2 at the start-up of the internal combustion engine is longer than a reference time for fuel pressure rise set in advance, it is determined that the removal of bubbles by the feed pump 12 is not sufficient. Then, it is determined that the amount of bubble generation in the fuel is larger than expected, and a threshold of the amount of bubbles is changed to a smaller value and used for the determination of the start of the operation of the feed pump 12. Alternatively, the bubble removal by the operation of the feed pump 12 is determined to be insufficient, and the operation time of the feed pump 12 is prolonged. For example, longer operation time of the feed pump 12 in the feed pump operation time determination map 83 (FIG. 10) is set for the same absolute value of the amount of changes in the cooling water temperature |ΔθHW|.

On the other hand, if the time required for the pressure rise at the start-up of the internal combustion engine 1 is extremely short, it means the excessive adjustment of the fuel pressure. In other words, the feed pump 12 or the like are driven more than necessary. Then, the power consumption might be increased. In such case, adjustment is done to bring about the reverse effect from the adjustment for the long pressure rise time. The threshold of the bubble amount used for the determination of the start of the operation of the feed pump 12 may be changed to a larger value, or the operation time of the feed pump 12 may be shortened.

Thus, based on the result of the start-up of the internal combustion engine 1, at least one of the operation condition or the operation time of the feed pump 12 which serves as the fuel feeding unit is adjusted and checked, whereby fluctuation in product quality derived from the manufacturing process of the fuel supply apparatus and the feed pump 12 can be suppressed, and the deterioration in the startability due to the changes over time can be reduced. Further, with the suppression of excessive operation of the feed pump 12, the power consumption can be reduced.

Thus, according to the first embodiment, the fuel supply controller is intermittently operated after the operation of the internal combustion engine is stopped, for the adjustment of the fuel pressure in the delivery pipe. Thus, the bubble generation is reduced and the fuel leakage is suppressed. As a result, the fuel pressure in the delivery pipe can be immediately increased at the restart of the internal combustion engine, whereby the startability can be enhanced. Further, the fuel consumption can be reduced. In addition, since the fuel supply controller is intermittently operated after the internal combustion engine is stopped, the reduction in power consumption is also allowed. The structure of the first embodiment is also applicable to embodiments described below as appropriate. The same components and structure with the first embodiment have the same effect and advantages as in the first embodiment.

Next, restriction of the operation of the fuel feeding unit and the fuel pressure decreasing unit according to a second embodiment will be described. For example, if the fuel feeding unit transports the fuel to the delivery pipe while fuel leakage happens in the fuel pipe system, the fuel may be blown out from the fuel pipes. In addition, when the charging capacity of the battery is not sufficient, for example, if the fuel supply control as described above is performed, there might be an unfavorable effect on the start-up of the internal combustion engine, since the fuel feeding unit and the fuel pressure decreasing unit are driven by the vehicle-mounted battery. The second embodiment intends to prevent these inconveniences in advance. Fuel supply control according to the second embodiment can be realized with the fuel supply controller 20 of the first embodiment. In the following, the description will be given with reference to FIGS. 5A and 5B.

Figure 12:
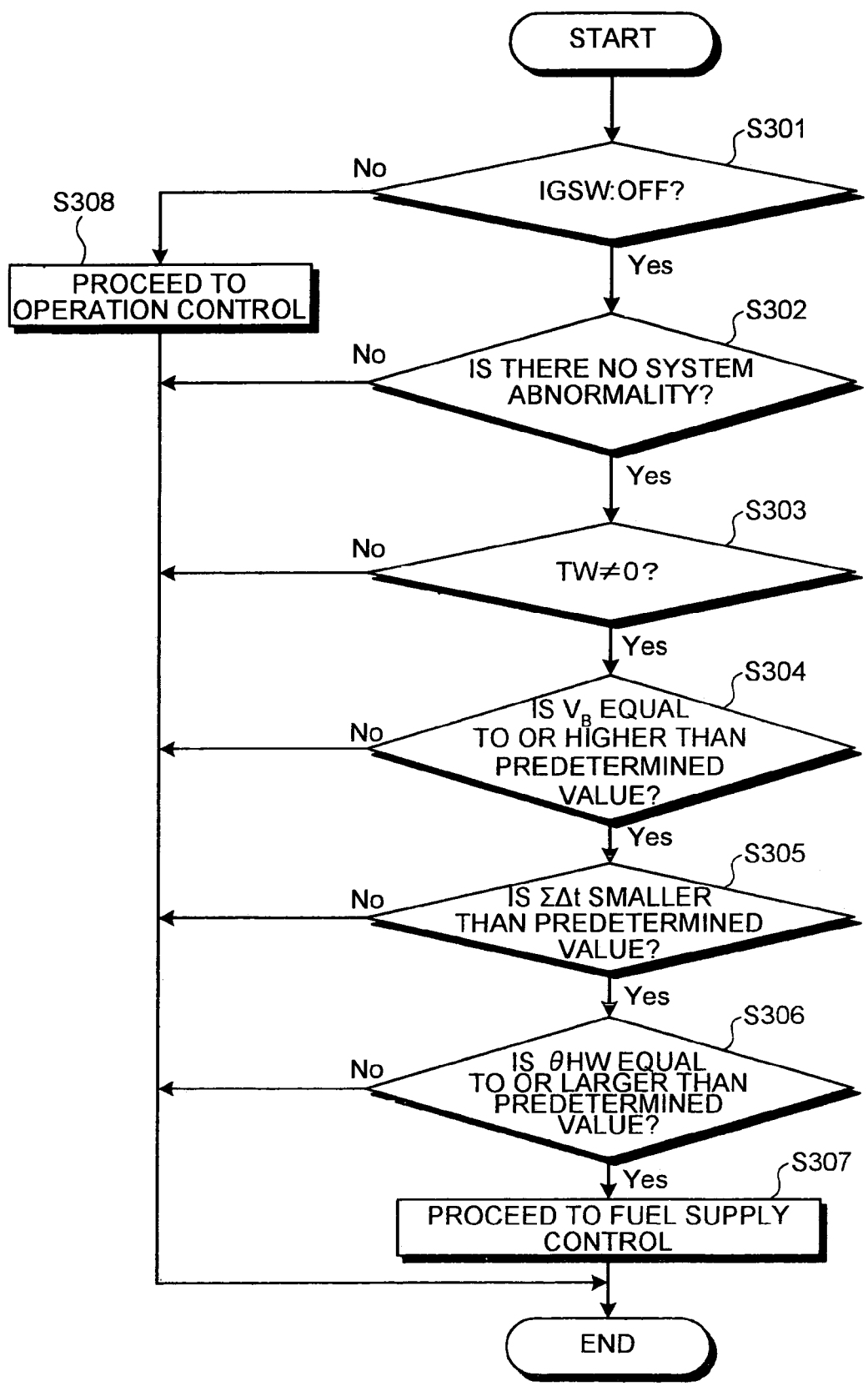
FIG. 12 is a flowchart of fuel supply control according to a second embodiment.

FIG. 12 is a flowchart of a sequence of fuel supply control according to the second embodiment. First, the processing unit 30p of the engine ECU 30 determines whether the IGSW is OFF or not (step S301), to determine whether to start the control. When the IGSW is ON (No in step S301), the internal combustion engine 1 is in operation, or is about to operate. Then, the fuel supply control described in connection with the first embodiment is not performed and the sequence proceeds to the operation control (step S308).

When the IGSW is OFF (Yes in step S301), the internal combustion engine 1 is under suspension. Hence, the sequence proceeds to the fuel supply control described in connection with the first embodiment. Prior to the fuel supply control of the first embodiment, the state determining unit 21 checks the fuel injection valve 3, the high pressure pump 10, the fuel pressure sensor 47, the feed pump 12, the electromagnetic relief valve 14, or the like to find abnormality such as failure or disconnections. If abnormality is found, the control is terminated (No in step S302), the warning is given via the alarm lamp or the like. Then, the user can deal with the failures of the fuel supply controller 20 and the engine ECU 30 by disassembling and conducting maintenance.

When no abnormality is found (Yes in step S302), the state determining unit 21 determined whether the operation time TW is zero or not (step S303). The timer is set to reactivate the fuel supply controller 20 and the engine ECU 30 after the internal combustion engine 1 stops operation. The state determining unit 21 checks the activation time TW so that the fuel supply control according to the first embodiment can be stopped if the battery is removed and the activation time TW is cleared after the operation of the internal combustion engine stops. Thus, the furl supply controller 20 and the engine ECU 30 can be disassembled or checked for maintenance thereof. When TW is zero (No in step S303) the control is terminated, whereas when TW is not zero (Yes in step S303) the sequence proceeds to the next step.

The state determining unit 21 determines whether battery voltage $V_B$ is equal to or higher than a predetermined level (step S304). When the battery voltage $V_B$ is below the predetermined level, the driving of the electromagnetic relief valve 14 and the feed pump 12 is stopped for the reduction in power consumption. Thus, the startability of the internal combustion engine 1 can be secured. When the battery voltage $V_B$ is lower than the predetermined level (No in step S304), the control is terminated. When the battery voltage $V_B$ is equal to or higher than the predetermined level (Yes in step S304), the sequence proceeds to the next step.

The state determining unit 21 determines whether accumulated operation time $S\Delta t$ of the electromagnetic relief valve 14 and the feed pump 12 is smaller than a predetermined value or not (step S305). The power consumption can be calculated based on the accumulated operation time of the electromagnetic relief valve 14 and the feed pump 12. When the calculated power consumption is above a predetermined level, it can be determined that the power of the battery 17 is burnt to negatively affect the start-up of the internal combustion engine 1. When the accumulated operation time $S\Delta t$ is equal to or higher than the predetermined level, the control terminates (No in step S305), whereas when the accumulated operation time $S\Delta t$ is below the predetermined level, the sequence proceeds to the next step (Yes in step S305).

The state determining unit 21 determines whether cooling water temperature θHW of the internal combustion engine 1 is equal to or higher than a predetermined value or not (step S306). In an environment with extremely low temperature, by the suppression of the power consumption, the internal combustion engine 1 needs to be securely maintained in a proper state so that the internal combustion engine 1 can start up properly. Hence, in the extremely low temperature, the operation of the electromagnetic relief valve 14 and the feed pump 12 is stopped. When the cooling water temperature θHW is below a predetermined value, the control terminates (No in step S306), whereas when the cooling water temperature θHW is equal to or higher than the predetermined value (Yes in step S306), the sequence proceeds to the fuel supply control of the first embodiment (step S307). When the control terminates, the state determining unit 21 prompts the user to check and repair by lighting up the alarm lamp 71 of the display panel 70 (see FIG. 2), or records the abnormality detection log in the memory unit 30m of the engine ECU 30 to be used for the identification of the defect portion.

Thus, according to the second embodiment, the conditions for operation restriction are set and the checked at the intermittent e activation of the fuel supply controller and the driving of the fuel feeding unit or the fuel pressure decreasing unit. Thus, the battery can be protected and the secure start-up of the internal combustion engine is allowed. In addition, since the fuel leakage can be prevented even when the fuel pipes are removed for the maintenance or repair, overall safety can be enhanced.

As can be seen from the foregoing, the fuel supply apparatus and the internal combustion engine according to the present invention is useful for internal combustion engines which directly inject the fuel into the combustion chamber, and more particularly suitable for the suppression of bubble generation in the fuel in the delivery pipe along with the reduction in power consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel supply apparatus, comprising:
a delivery pipe that accumulates fuel to be supplied to an internal combustion engine;
a fuel feeding unit that supplies fuel to the delivery pipe;
a fuel supply controller that includes a state determining unit which determines bubble generation in the fuel in the delivery pipe, and a fuel pressure controlling unit which activates the fuel feeding unit when the bubble generation is expected; and
an activating unit that intermittently activates the fuel supply controller while operation of the internal combustion engine is under suspension, and operates even while the fuel supply controller suspends its operation.

2. A fuel supply apparatus, comprising:
a delivery pipe that accumulates fuel to be supplied to an internal combustion engine;
a fuel pressure decreasing unit that decreases a fuel pressure in the delivery pipe;
a fuel supply controller that includes a state determining unit which determines fuel leakage from a fuel injection valve to which fuel is supplied from the delivery pipe, and a fuel pressure controlling unit which activates the fuel pressure decreasing unit when the fuel leakage is expected; and
an activating unit that intermittently activates the fuel supply controller while operation of the internal combustion engine is under suspension, and operates even while the fuel supply controller is under suspension.

3. A fuel supply apparatus, comprising:
a delivery pipe that accumulates fuel to be supplied to an internal combustion engine;
a fuel pressure decreasing unit that decreases a fuel pressure in the delivery pipe;
a fuel feeding unit that supplies fuel to the delivery pipe;
a fuel supply controller that includes a state determining unit which determines at least one of bubble generation in fuel in the delivery pipe and fuel leakage from a fuel injection valve to which fuel is supplied from the delivery pipe, and a fuel pressure controlling unit which activates the fuel feeding unit when the bubble generation is expected and activates the fuel pressure decreasing unit when the fuel leakage is expected; and
an activating unit that intermittently activates the fuel supply controller while operation of the internal combustion engine is under suspension, and operates even while the fuel supply controller suspends its operation.

4. The fuel supply apparatus according to claim 3, wherein
the fuel supply controller further comprises an activation controller that determines an activation time to activate the state determining unit and the fuel pressure controlling unit at predetermined intervals,
the activating unit counts up the determined activation time, and intermittently activates the state determining unit and the fuel pressure controlling unit.

5. The fuel supply apparatus according to claim 3, wherein
the fuel pressure controlling unit activates the fuel feeding unit when fuel pressure in the delivery pipe is equal to or lower than a saturated vapor pressure of fuel in the delivery pipe, and the fuel pressure in the delivery pipe and cooling water temperature of the internal combustion engine are on a decline.

6. The fuel supply apparatus according to claim 3, wherein
the fuel pressure controlling unit determines a target fuel pressure of the delivery pipe based on temperature change of the fuel in the delivery pipe, and activates one of the fuel feeding unit and the fuel pressure decreasing unit so that the fuel pressure in the delivery pipe attain a level of the determined target fuel pressure.

7. The fuel supply apparatus according to claim 4, wherein
the activation controller determines an interval to intermittently activate the state determining unit and the fuel pressure controlling unit based on a trend of changes in the fuel pressure in the delivery pipe and in a cooling water temperature of the internal combustion engine.

8. The fuel supply apparatus according to claim 7, wherein
an interval to intermittently activate the state determining unit and the fuel pressure controlling unit is corrected based on an external air temperature.

9. The fuel supply apparatus according to claim 3 wherein
the fuel pressure controlling unit activates the fuel pressure decreasing unit when the fuel pressure is equal to or higher than a minimum operation pressure of the fuel pressure decreasing unit and equal to or higher than a saturated vapor pressure of the fuel in the delivery pipe, and when the fuel pressure is at a level expected to cause the fuel leakage equal to or more than a predetermined amount.

10. The fuel supply apparatus according to claim 9, wherein
an operation time of the fuel pressure decreasing unit is set from start of the operation of the fuel pressure decreasing unit up to a point where the fuel leakage is expected to be less than the predetermined amount.

11. The fuel supply apparatus according to claim 3 wherein
the fuel pressure controlling unit activates the fuel feeding unit when the fuel pressure is equal to or lower than a saturated vapor pressure determined by the temperature of the fuel, the temperature of the fuel in the delivery pipe is on a decline, and an amount of bubbles in the fuel expected from temperature changes in the fuel, a volume of the delivery pipe, and an expansion coefficient of the fuel is equal to or more than a predetermined amount.

12. The fuel supply apparatus according to claim 11, wherein
an operation time of the fuel feeding unit is from a start of the operation of the fuel feeding unit up to a point where the amount of bubbles becomes less than the predetermined amount.

13. The fuel supply apparatus according to claim 11, wherein
the fuel pressure controlling unit changes an operation condition of the fuel feeding unit when a time required for rise of the fuel pressure in the delivery pipe at start-up of the internal combustion engine is longer than a predetermined reference pressure rise time.

14. The fuel supply apparatus according to claim 3, wherein
the activating unit stops reactivation of the state determining unit and the fuel pressure controlling unit when a change in the fuel pressure in the delivery pipe is in a predetermined range after the activation of one of the fuel pressure decreasing unit and the fuel feeding unit.

15. The fuel supply apparatus according to claim 3, wherein
the activation of the state determining unit and the fuel pressure controlling unit is stopped either when a battery for operation of the internal combustion engine is removed or when voltage of the battery drops to a level equal to or lower than a predetermined value.

16. The fuel supply apparatus according to claim 3, wherein
the activation of the state determining unit and the fuel pressure controlling unit is stopped when a sum of an operation time of the fuel pressure decreasing unit and an operation time of the fuel feeding unit exceeds a predetermine time.

17. An internal combustion engine provided with a delivery pipe for accumulating fuel, comprising:
a fuel supply apparatus including
a fuel feeding unit that supplies fuel to the delivery pipe;
a fuel supply controller that includes a state determining unit which determines bubble generation in fuel in the delivery pipe, and a fuel pressure controlling unit which activates the fuel feeding unit when the bubble generation is expected; and
an activating unit that intermittently activates the fuel supply controller while operation of the internal combustion engine is under suspension, and operates even while the fuel supply controller suspends its operation, wherein
a fuel injection valve that injects fuel into a combustion chamber is attached to the delivery pipe of the fuel supply apparatus, and fuel is supplied to the fuel injection valve from the delivery pipe.

18. An internal combustion engine provided with a delivery pipe for accumulating fuel, comprising:
a fuel supply apparatus including
a fuel pressure decreasing unit that decreases a fuel pressure in the delivery pipe;
a fuel supply controller that includes a state determining unit which determines fuel leakage from a fuel injection valve to which fuel is supplied from the delivery pipe, and a fuel pressure controlling unit which activates the fuel pressure decreasing unit when the fuel leakage is expected, the fuel injection valve injecting fuel into the combustion chamber; and
an activating unit that intermittently activates the fuel supply controller while operation of the internal combustion engine is under suspension, and operates even while the fuel supply controller is under suspension.

19. An internal combustion engine provided with a delivery pipe for accumulating fuel, comprising:
a fuel supply apparatus including
a fuel pressure decreasing unit that decreases a fuel pressure in the delivery pipe;
a fuel feeding unit that supplies fuel to the delivery pipe;
a fuel supply controller that includes a state determining unit which determines at least one of bubble generation in fuel in the delivery pipe and fuel leakage from a fuel injection valve to which fuel is supplied from the delivery pipe, and a fuel pressure controlling unit which activates the fuel feeding unit when the bubble generation is expected and activates the fuel pressure decreasing unit when the fuel leakage is expected, the fuel injection valve injecting fuel into the combustion chamber; and an activating unit that intermittently activates the fuel supply controller while operation of the internal combustion engine is under suspension, and operates even while the fuel supply controller is under suspension.

* * * * *